US010388939B2

(12) United States Patent
Urano et al.

(10) Patent No.: US 10,388,939 B2
(45) Date of Patent: Aug. 20, 2019

(54) SECONDARY BATTERY

(71) Applicant: Hitachi Automotive Systems, Ltd., Hitachinaka-shi, Ibaraki (JP)

(72) Inventors: Kazuaki Urano, Hitachinaka (JP); Keisuke Sawada, Hitachinaka (JP); Takuro Tsunaki, Hitachinaka (JP); Masaaki Iwasa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 218 days.

(21) Appl. No.: 15/300,816

(22) PCT Filed: Apr. 7, 2015

(86) PCT No.: PCT/JP2015/060801
§ 371 (c)(1),
(2) Date: Sep. 30, 2016

(87) PCT Pub. No.: WO2015/156270
PCT Pub. Date: Oct. 15, 2015

(65) Prior Publication Data
US 2017/0025669 A1 Jan. 26, 2017

(30) Foreign Application Priority Data
Apr. 9, 2014 (JP) ................. 2014-080293

(51) Int. Cl.
*H01M 2/34* (2006.01)
*H01M 2/30* (2006.01)
(Continued)

(52) U.S. Cl.
CPC ............ *H01M 2/345* (2013.01); *H01M 2/26* (2013.01); *H01M 2/30* (2013.01); *H01M 2/34* (2013.01);
(Continued)

(58) Field of Classification Search
None
See application file for complete search history.

(56) References Cited

U.S. PATENT DOCUMENTS

| 2015/0171412 A1 | 6/2015 | Matsumoto et al. |
| 2015/0295221 A1 | 10/2015 | Urano et al. |

FOREIGN PATENT DOCUMENTS

| JP | 2012-38529 A | 2/2012 |
| JP | 2013-164923 A | 8/2013 |

(Continued)

OTHER PUBLICATIONS

JPO English abstract for JP 2014-139906 (2014).*
(Continued)

*Primary Examiner* — Sin J Lee
(74) *Attorney, Agent, or Firm* — Crowell & Moring LLP

(57) ABSTRACT

Provided is a secondary battery which can more securely suppress vibrations applied to a current interrupting mechanism. A secondary battery including: a current interrupting mechanism that interrupts a current path between an external terminal and an electrode in a battery container. The current interrupting mechanism includes a collector plate that is connected to the electrode, a diaphragm that is connected to a base portion of the collector plate and disconnected from the base portion by being deformed when a pressure in the battery container is increased, and an insulating member that fixes the diaphragm and the base portion of the collector plate on the inside of the battery container. The insulating member includes a plurality of projections that protrude in a thickness direction of the base portion, and the base portion includes a plurality of notches through which the projection passes in the thickness direction. The projection includes an engaging member that is engaged with an end surface of the base portion on a side opposite to the
(Continued)

insulating member and a side surface of the base portion along the thickness direction.

9 Claims, 13 Drawing Sheets

(51) Int. Cl.
  *H01M 2/26* (2006.01)
  *H01M 10/0525* (2010.01)
  *H01M 10/0587* (2010.01)
  *H01M 10/052* (2010.01)
(52) U.S. Cl.
  CPC ....... *H01M 2/347* (2013.01); *H01M 10/0525* (2013.01); *H01M 10/052* (2013.01); *H01M 10/0587* (2013.01); *H01M 2200/20* (2013.01)

(56) References Cited

FOREIGN PATENT DOCUMENTS

| JP | 2013-225500 A | 10/2013 |
| JP | 2014-53175 A | 3/2014 |
| JP | 2014-139906 A | 7/2014 |
| WO | WO 2014/080518 A1 | 5/2014 |

OTHER PUBLICATIONS

Machine-assisted English translation for JP 2014-139906 (2014).*
JPO English abstract for JP 2013-225500 (2013).*
Machine-assisted English translation for JP 2013-225500 (2013).*
International Search Report (PCT/ISA/210) issued in PCT Application No. PCT/JP2015/060801 dated Jun. 9, 2015 with English translation (5 pages).
Japanese-language Written Opinion (PCT/ISA/237) issued in PCT Application No. PCT/JP2015/060801 dated Jun. 9, 2015 (4 pages).

* cited by examiner

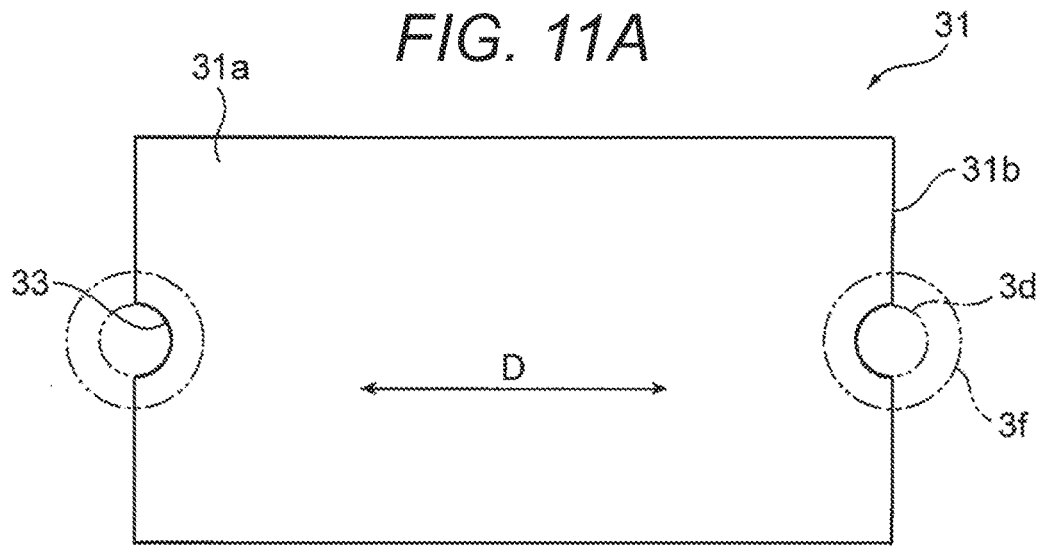
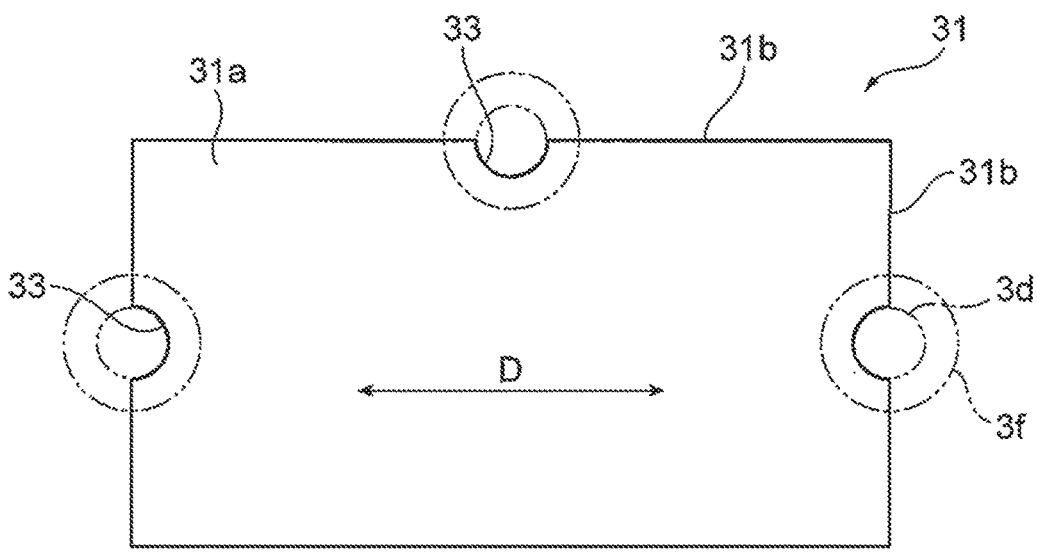

SECONDARY BATTERY

TECHNICAL FIELD

The present invention relates to a secondary battery which includes a current interrupting mechanism which interrupts a current path between an external terminal and an electrode in a battery container.

BACKGROUND ART

Conventionally, a secondary battery is widely used as a power source of a vehicle motor and other electronic apparatuses for example. In the secondary battery, for example, in a case where a gas pressure in the battery is increased by overcharging, overheating, or a damage caused by an external force, the current is necessarily interrupted to increase safety. As a secondary battery, there is known a secondary battery in which the current is interrupted by a deforming member which is deformed as a pressure in a case is increased and is mechanically disconnected from a collector (for example, see PTL 1 below).

PTL 1 has an object to prevent vibrations applied to an interrupting mechanism which may generate an erroneous operation on the interrupting mechanism to interrupt the current of the secondary battery. In order to solve the problem, there are provided an electrode terminal which protrudes to the outside of the case and is electrically connected to the deforming member, and a holder which is formed of an insulating material and supports the collector in a state of being fixed to the case. The holder includes a boss. The boss passes through the collector, and the end portion is formed along the outer surface of the collector by a thermally caulking process. In PTL 1, the boss can come into contact with the collector without a gap by performing the thermally caulking process on the boss. A backlash can be suppressed from being generated in a portion of supporting the collector by the holder, and the vibration of the collector can be suppressed.

CITATION LIST

Patent Literature

PTL 1: JP 2013-225500 A

SUMMARY OF INVENTION

Technical Problem

In the secondary battery of PTL 1, the boss of an electric collector holder is inserted into a through hole provided in a pedestal of a positive electrode collector to pass in a direction toward a battery case bottom surface, and the end of the boss is subjected to the thermally caulking process. Therefore, the enlarged end of the boss comes into tight contact with the surface facing the battery case bottom surface of the pedestal of the collector, the gap between the collector and the end of the boss is reduced in the axial direction of the boss passing through the pedestal of the collector, and the vibration of the collector is suppressed.

However, since the boss of the electric collector holder passes to the through hole of the pedestal of the collector at assembling in the secondary battery disclosed in PTL 1, a gap in a radial direction is generated between an inner peripheral surface of the through hole and an outer peripheral surface of the boss due to dimension tolerances of the through hole and the boss. Since it is difficult to fill the gap by the thermally caulking process of the boss, the gap in the radial direction is left between the inner peripheral surface of the through hole and the outer peripheral surface of the boss even after the thermally caulking process. Therefore, there is a concern that the pedestal of the collector vibrates in the radial direction of the boss, and an erroneous operation of the interrupting mechanism is generated by the vibration added to the interrupting mechanism.

The invention has been made in view of the above problems, and an object thereof is to provide a secondary battery which can more securely suppress vibrations applied to a current interrupting mechanism.

Solution to Problem

In order to achieve the object, a secondary battery according to the present invention includes: a current interrupting mechanism that interrupts a current path between an external terminal and an electrode in a battery container, wherein the current interrupting mechanism includes a collector plate that is connected to the electrode, a diaphragm that is connected to a base portion of the collector plate and disconnected from the base portion by being deformed when a pressure in the battery container is increased, and an insulating member that fixes the diaphragm and the base portion of the collector plate on the inside of the battery container, wherein the insulating member includes a plurality of projections that protrude in a thickness direction of the base portion, wherein the base portion includes a plurality of notches through which the projection passes in the thickness direction, and wherein the projection includes an engaging member which is engaged with an end surface of the base portion on a side opposite to the insulating member and a side surface of the base portion along the thickness direction.

Advantageous Effects of Invention

In the secondary battery of the invention, a projection, which is extended in a direction of passing through a base portion of a collector plate from an insulating member fixing the base portion of the collector plate to the inside of the battery container, passes through a notch provided in the base portion of the collector plate and is disposed along the notch. Then, the projection includes an engaging member which is engaged to the end surface of the base portion of the collector plate on a side opposite to the insulating member and the side surface of the base portion of the collector plate along a thickness direction of the base portion. Therefore, the base portion of the collector plate is held between the insulating member and the engaging member to prevent the collector plate from vibrating in the thickness direction of the base portion, and also the side surface of the base portion of the collector plate is fixedly supported by the engaging member, so that the collector plate is prevented from vibrating in the radial direction of the projection. Therefore, the vibration applied from the collector plate to the current interrupting mechanism can be more securely suppressed, and an erroneous operation of the current interrupting mechanism can be more securely prevented.

BRIEF DESCRIPTION OF DRAWINGS

FIG. 11A is a plan view illustrating an example of a layout of the notches of the base portion of the collector plate.

FIG. 11B is a plan view illustrating an example of a layout of the notches of the base portion of the collector plate.

DESCRIPTION OF EMBODIMENTS

First Embodiment

Hereinafter, a first embodiment of a secondary battery of the invention will be described with reference to the drawings.

Figure 1:
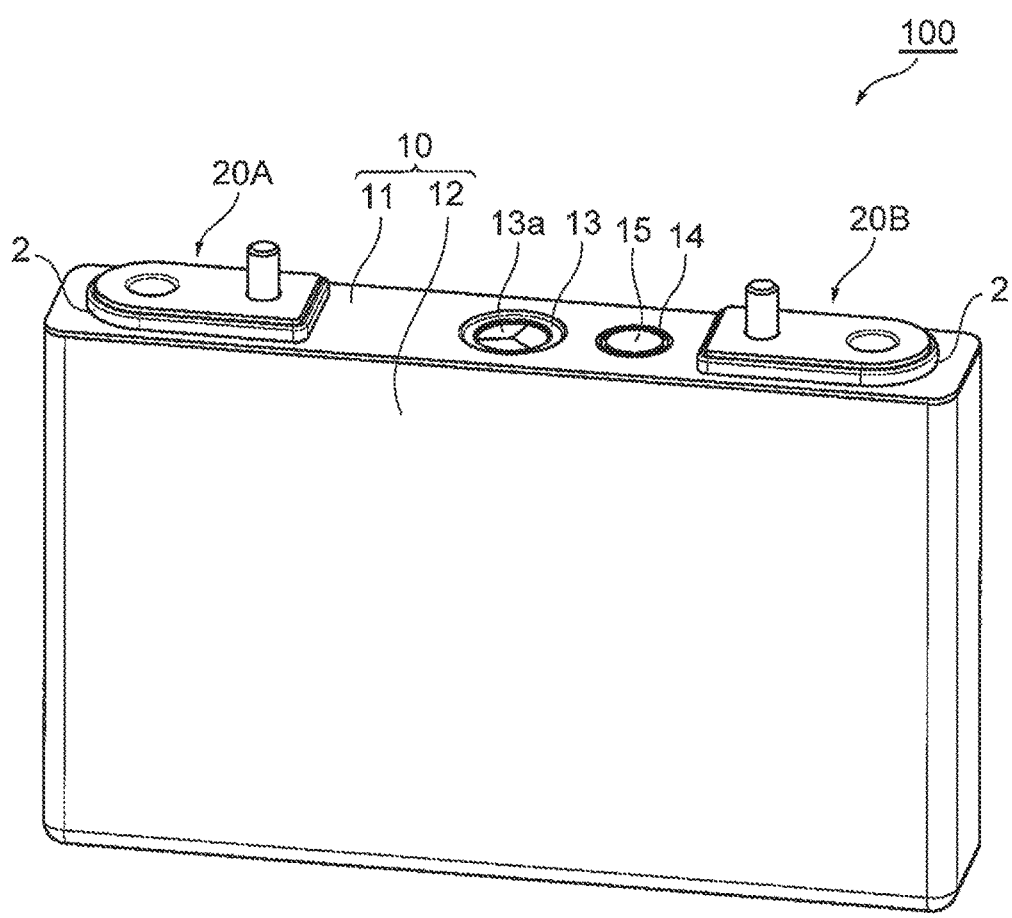
FIG. 1 is a perspective view illustrating an outer appearance of a secondary battery according to a first embodiment of the invention.

FIG. 1 is a perspective view of a secondary battery 100 of this embodiment.

The secondary battery 100 of this embodiment is a rectangular secondary battery including a flat box shape of battery container 10 which is configured by, for example, a battery lid 11 of a rectangular plate shape and a battery can 12 of a bottomed rectangular cylindrical shape. The battery container 10 is made of a metal material such as an aluminum alloy.

In both ends of the battery container 10 in the width direction (that is, both ends of the battery lid 11 in the longitudinal direction), external terminals 20A and 20B of a positive electrode and a negative electrode are provided in the upper surface of the battery lid 11 on the outside of the battery container 10. An insulating member 2 is disposed between the external terminals 20A and 20B and the battery lid 11, and the external terminals 20A and 20B are electrically insulated from the battery lid 11. The external terminal 20A of the positive electrode is made of aluminum or an aluminum alloy for example. The external terminal 20B of the negative electrode is made of copper or a copper alloy for example.

A gas exhaust valve 13 and a liquid injection port 14 are provided between the external terminals 20A and 20B of the positive electrode and the negative electrode of the battery lid 11. The gas exhaust valve 13 is provided by making the battery lid 11 thin and by forming a groove portion 13a for example, and is cleaved when an inner pressure of the battery container 10 exceeds a predetermined value to discharge the gas contained therein, so that the inner pressure of the battery container 10 is lowered. The liquid injection port 14 is used to inject a liquid electrolyte into the battery container 10, and a liquid injection plug 15 is welded by a laser welding for example so as to be sealed.

Figure 2:
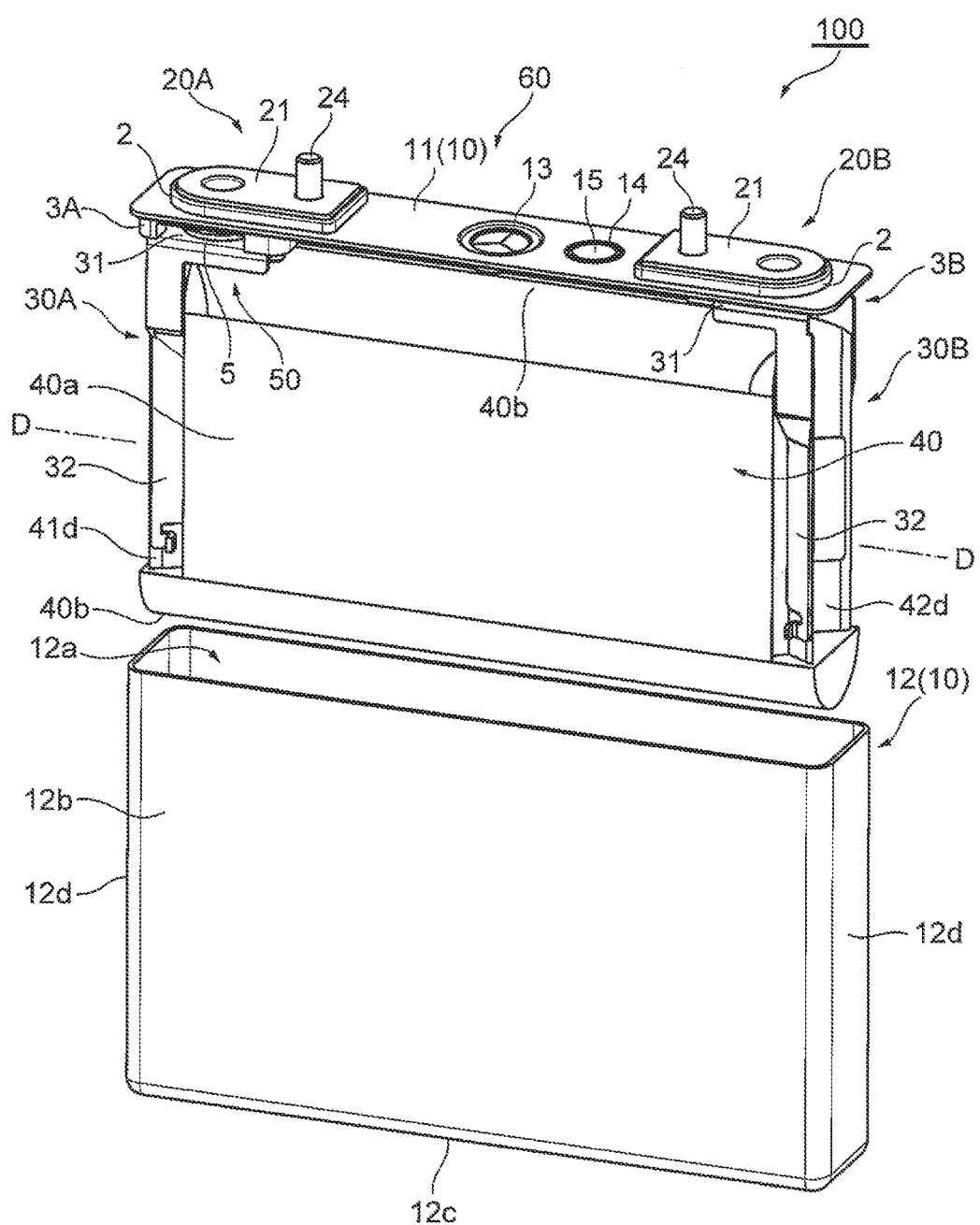
FIG. 2 is an exploded perspective view illustrating the secondary battery of FIG. 1.

FIG. 2 is an exploded perspective view of the secondary battery 100 of FIG. 1.

In both ends of the battery lid 11 in the longitudinal direction, collector plates 30A and 30B of the positive electrode and the negative electrode are fixed through insulating members 3A and 3B to the lower surface of the battery lid 11 which is the inside of the battery container 10. The collector plates 30A and 30B each include base portions 31 which are provided substantially parallel to the lower surface of the battery lid 11 and fixed to the insulating members 3A and 3B, and terminal portions 32 which are extended toward a bottom surface 12c of the battery can 12 from the base portion 31. The collector plate 30A of the positive electrode is made of aluminum or an aluminum alloy for example. The collector plate 30B of the negative electrode is made of copper or a copper alloy for example.

The secondary battery 100 includes a current interrupting mechanism 50 which interrupts a current path between the external terminal 20A of the positive electrode and the electrode in the battery container 10. The current interrupting mechanism 50 includes, as main component, the collector plate 30A on a positive side, a diaphragm 5, and the insulating member 3A through which the diaphragm 5 and the base portion 31 of the collector plate 30A are fixed to the lower surface of the battery lid 11 serving as the inside of the battery container 10.

The diaphragm 5 is connected to the base portion 31 of the collector plate 30A, and forms a part of the current path between the external terminal 20A and a described-below positive electrode 41 (see FIG. 3) of an electrode group 40 in the battery container 10. As described later, the diaphragm 5 is configured to be deformed toward the outer side of the battery container 10 by a pressure rise in the battery container 10, and to release the connection with the base portion 31 of the collector plate 30A.

The terminal portions 32 of the collector plates 30A and 30B of the positive electrode and the negative electrode are formed in a plate shape extending from the both ends of the base portion 31 in a thickness direction of the battery container 10 toward the bottom surface 12c of the battery can 12 along a wide side surface 12b having the largest area of the battery can 12. The terminal portions 32 of the collector plates 30A and 30B are extended from the end on the outside of the base portion 31 in a winding axis direction D of the electrode group 40 described later, and bonded to collector plate junctions 41d and 42d at the end of the electrode group 40.

Therefore, the collector plate 30A of the positive electrode is disposed in one end in the winding axis direction D to be electrically connected to the positive electrode 41 of the electrode group 40. The collector plate 30B of the negative electrode is disposed in the other end in the winding axis direction D to be electrically connected to a negative electrode 42 (see FIG. 3) of the electrode group. In addition, the electrode group 40 is bonded to the terminal portion 32 and thus fixed to the battery lid 11 through the collector plates 30A and 30B and the insulating members 3A and 3B. In addition, the external terminals 20A and 20B, the insulating member 2, the insulating members 3A and 3B, the collector plates 30A and 30B, the current interrupting mechanism 50, and the electrode group 40 are assemble to the battery lid 11, so that a lid assembly 60 is configured.

At the time of assembling the secondary battery 100, the lid assembly 60 is inserted into an opening 12$a$ of the battery can 12 from a bent portion 40$b$ in the bottom of the electrode group 40 in a state where an insulating sheet (not illustrated) is disposed between the electrode group 40 and the battery can 12 for electrical insulation. Narrow side surfaces 12$d$ and 12$d$ of the battery can 12 are positioned on both sides in the winding axis direction D, and the electrode group 40 is contained into the battery can 12 such that the winding axis direction D is substantially parallel to the bottom surface 12$c$ and the wide side surface 12$b$ of the battery can 12.

Therefore, the electrode group 40 becomes a state where one bent portion 40$b$ faces the battery lid 11, and the other bent portion 40$b$ faces the bottom surface 12$c$ of the battery can 12, and a plan surface 40$a$ faces the wide side surface 12$b$. Then, the battery container 10, which is configured by the battery lid 11 and the battery can 12, is formed by bonding the entire periphery of the battery lid 11 to the opening 12$a$ of the battery can 12, for example by a laser welding, in a state where the opening 12$a$ of the battery can 12 is closed by the battery lid 11.

Thereafter, a nonaqueous liquid electrolyte is injected into the battery container 10 through the liquid injection port 14 of the battery lid 11, and the liquid injection plug 15 is bonded to the liquid injection port 14 by a laser welding for example, so that the battery container 10 is sealed. As a nonaqueous liquid electrolyte to be injected into the battery container 10, there can be used a solution obtained by dissolving lithium hexafluorophosphate ($LiPF_6$) having a concentration of 1 mol/liter in a mixed solution obtained by mixing ethylene carbonate and dimethyl carbonate for example at a volume ratio of 1:2.

Figure 3:
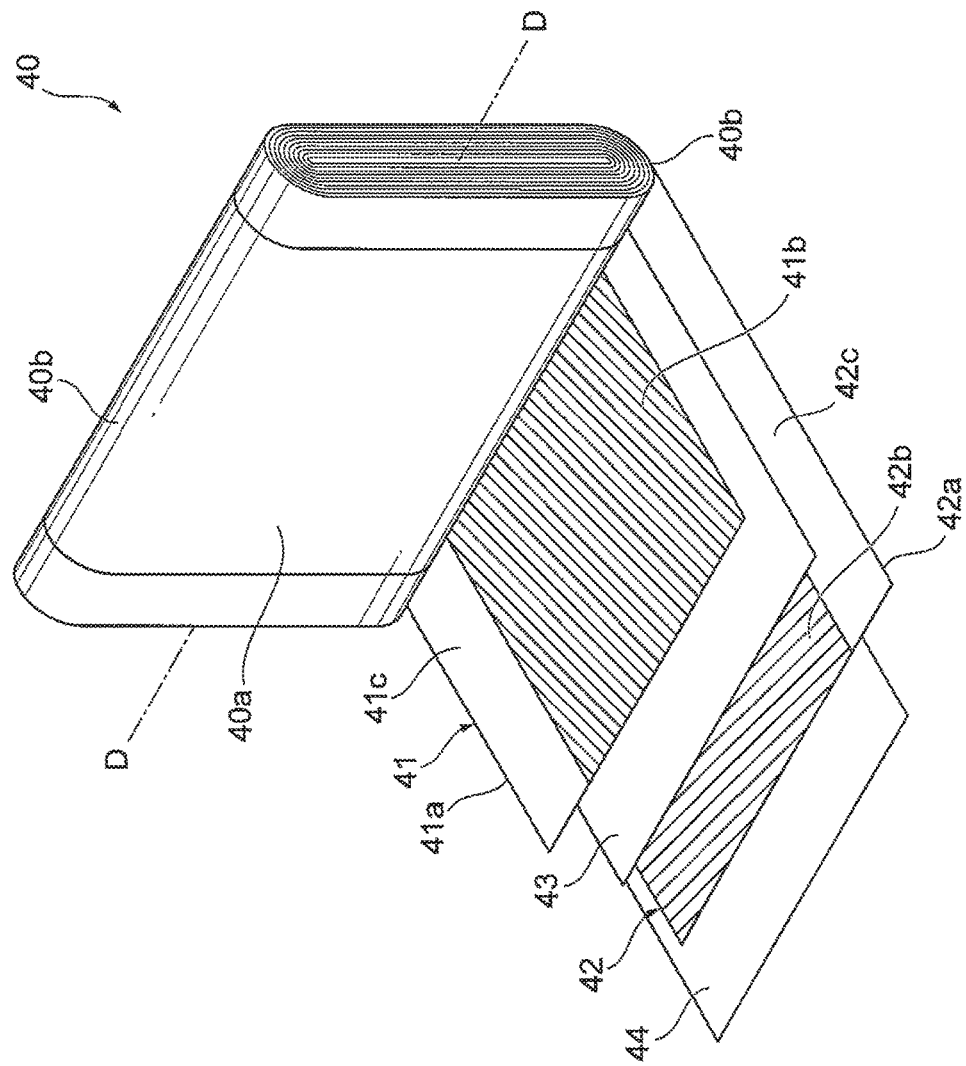
FIG. 3 is an exploded perspective view illustrating an electrode group of the secondary battery of FIG. 1.

FIG. 3 is an exploded perspective view in which the electrode group 40 of FIG. 2 is partially expanded.

The electrode group 40 is a flat winding electrode group which is formed by winding the positive and negative electrodes 41 and 42 stacked with the separators 43 and 44 interposed therebetween about an axial center parallel to the winding axis D. The electrode group 40 includes a pair of flat plan surfaces 40$a$ which are disposed to face the wide side surface 12$b$ of the battery can 12, and a pair of half-cylindrical bent portions 40$b$ which are disposed to face the battery lid 11 and the bottom surface 12$c$ of the battery can 12. The separators 43 and 44 insulate the positive electrode 41 from the negative electrode 42, and the separator 44 is wound on the outside of the negative electrode 42 which is wound in the outmost periphery.

The positive electrode 41 includes a positive electrode foil 41$a$ serving as a positive electrode collector, and a positive electrode mixture layer 41$b$ made of an active material for the positive electrode which is coated on both surfaces of the positive electrode foil 41$a$. The positive electrode mixture layer 41$b$ is not formed on one side of the positive electrode 41 in the width direction, but configured by a foil exposed portion 41$c$ in which the positive electrode foil 41$a$ is exposed. The positive electrode 41 is wound about the winding axis D while the foil exposed portion 41$c$ is disposed on the opposite side in the winding axis direction D with respect to a foil exposed portion 42$c$ of the negative electrode 42.

The positive electrode 41 may be manufactured by coating both surfaces of the positive electrode foil 41$a$, except one side in the width direction, with the active material for the positive electrode which is prepared by adding and kneading a conductive material, a binding agent, and a dispersant to the active material for the positive electrode, and then drying, pressing, and cutting it, for example. As the positive electrode foil 41$a$, an aluminum foil having a thickness of about 20 μm may be used. The thickness of the positive electrode mixture layer 41$b$ except the thickness of the positive electrode foil 41$a$ is about 90 μm for example.

As an example of a material of the active material for the positive electrode, lithium manganate (chemical formula: $LiMn_2O_4$) of 100 parts by weight may be used as the active material for the positive electrode, flaky graphite of 10 parts by weight may be used as a conductive material, polyvinylidene fluoride (hereinafter, referred to as PVDF) of 10 parts by weight may be used as the binding agent, and N-methylpyrrolidone (hereinafter, referred to as NMP) may be used as the dispersant. The active material for the positive electrode is not limited to the above lithium manganate. For example, there may be used a lithium-manganese composite oxide which is obtained by replacing or doping a part of other lithium manganates having a spinel crystal structure with a metal element. In addition, as an example of the active material for the positive electrode, there may be used a lithium-transition metal compound oxide which is obtained by replacing or doping lithium cobalt oxide having a layered crystal structure and a part thereof with a metal element.

The negative electrode 42 includes a negative electrode foil 42$a$ serving as a negative electrode collector, and a negative electrode mixture layer 42$b$ made of an active material for the negative electrode coated on both surfaces of the negative electrode foil 42$a$. One side of the negative electrode 42 in the width direction is not formed with the negative electrode mixture layer 42$b$, and forms the foil exposed portion 42$c$ where the negative electrode foil 42$a$ is exposed. The negative electrode 42 is wound about the winding axis D while the foil exposed portion 42$c$ is disposed on the opposite side in the winding axis direction D with respect to the foil exposed portion 41$c$ of the positive electrode 41.

The negative electrode 42 may be manufactured by coating both surfaces of the negative electrode foil 42$a$, except one side in the width direction, with the active material for the negative electrode prepared by adding and kneading the binding agent and the dispersant to the active material for the negative electrode, and then drying, pressing, and cutting it. As the negative electrode foil 42$a$, a copper foil having a thickness of about 10 μm may be used. The thickness of the negative electrode mixture layer 42$b$ except the thickness of the negative electrode foil 42$a$ is about 70 μm for example.

As an example of a material of the active material for the negative electrode, amorphous carbon powder of 100 parts by weight may be used as the active material for the negative electrode, PVDF of 10 parts by weight may be used as the binding agent, and NMP may be used as the dispersant. The active material for the negative electrode is not limited to the above amorphous carbon powder. Natural graphite in which lithium ions can intercalate and desorb, various types of artificial graphite materials, carbonaceous material such as coke, a compound of Si or Sn (for example, $SiO$, $TiSi_2$, etc.), or a combined material thereof may be used as the active material. A particle shape of the active material for the negative electrode is also not particularly limited, and may be appropriately selected from a squamous shape, a spherical shape, a fibrous shape, or a bulk shape.

Further, a binder used in the mixture layers 41b and 42b of the positive electrode and the negative electrode is not limited to the PVDF. As the binder, for example, a polymer such as polytetrafluoroethylene (PTFE), polyethylene, polystyrene, polybutadiene, butyl rubber, nitrile rubber, styrene butadiene rubber, polysulfide rubber, cellulose nitrate, cyanoethyl cellulose, various types of latexes, acrylic nitrile, vinyl fluoride, vinylidene fluoride, fluorid propylene, fluorid chloroprene, and acrylic resin, and a mixture thereof may be used.

In addition, the axial core when the positive electrode 41 and the negative electrode 42 are wound with the separators 43 and 44 interposed therebetween may be formed by winding a resin sheet having a bending rigidity higher than any one of the positive electrode foil 41a, the negative electrode foil 42a, and the separators 43 and 44 for example.

The width of the negative electrode mixture layer 42b of the negative electrode 42 in the winding axis direction D of the electrode group 40 is wider than that of the positive electrode mixture layer 41b of the positive electrode 41. In addition, the negative electrode 42 is wound in the innermost periphery and the outermost periphery of the electrode group 40. Therefore, the positive electrode mixture layer 41b is interposed between the negative electrode mixture layers 42b from the innermost periphery to the outermost periphery of the electrode group 40.

The foil exposed portions 41c and 42c of the positive electrode 41 and the negative electrode 42 each are bounded by the plan surface 40a of the electrode group 40 to form the collector plate junctions 41d and 42d (see FIG. 2). The collector plate junctions 41d and 42d of the positive electrode 41 and the negative electrode 42 each are bonded to the terminal portions 32 of the collector plates 30A and 30B of the positive electrode and the negative electrode by an ultrasonic welding for example. Therefore, the external terminals 20A and 20B each are electrically connected to the positive and negative electrodes 41 and 42 forming the electrode group 40 through the collector plates 30A and 30B on the positive and the negative sides.

Further, the widths of the separators 43 and 44 are wider than that of the negative electrode mixture layer 42b in the winding axis direction D of the electrode group 40. The foil exposed portions 41c and 42c of the positive electrode 41 and the negative electrode 42 each protrude outward in the width direction from the ends of the separators 43 and 44. Therefore, the separators 43 and 44 bind the foil exposed portions 41c and 42c, and do not become an obstacle when welding.

Figure 4:
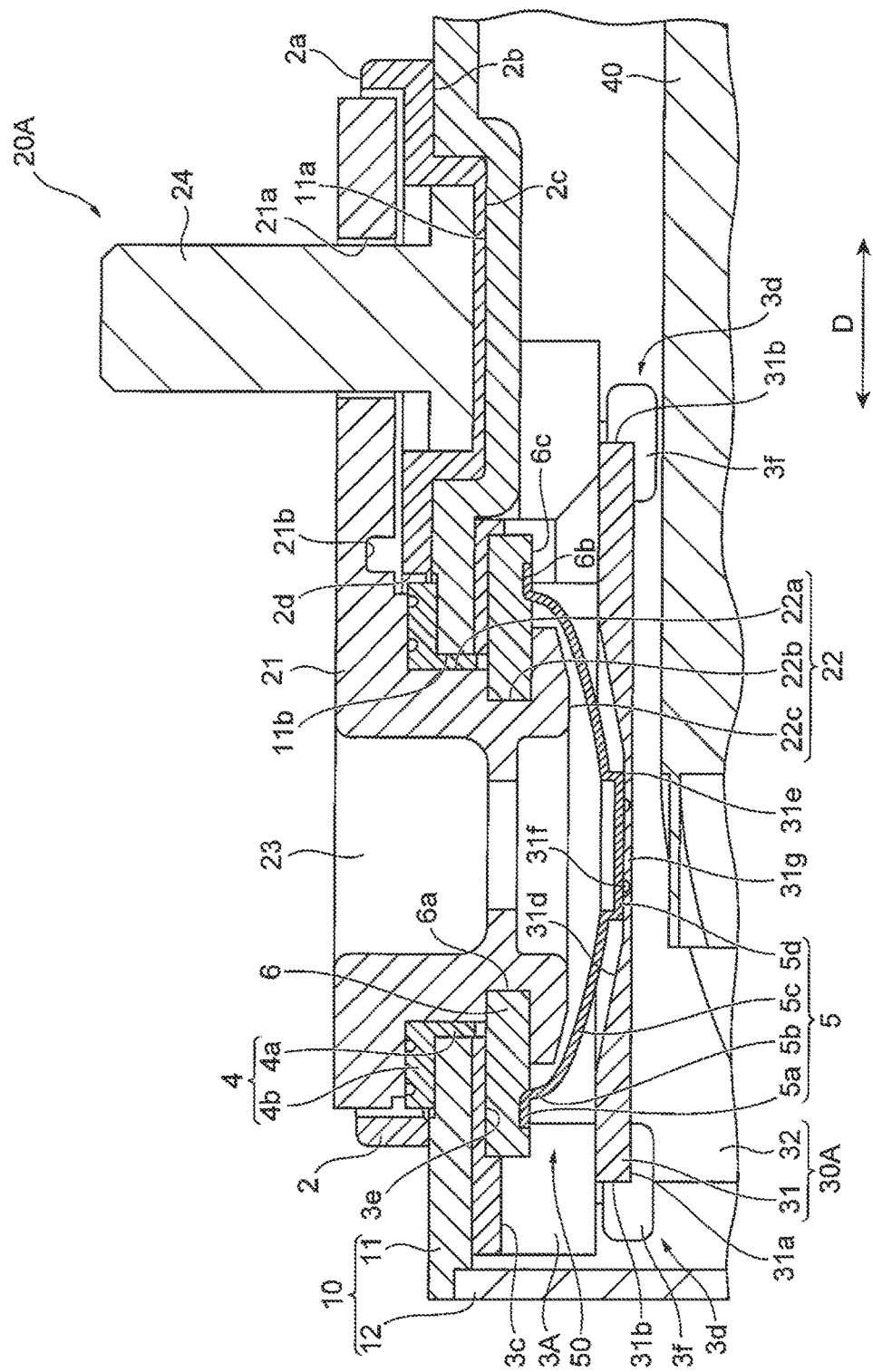
FIG. 4 is an enlarged cross-sectional view illustrating the vicinity of a current interrupting mechanism of the secondary battery of FIG. 1.
Figure 5:
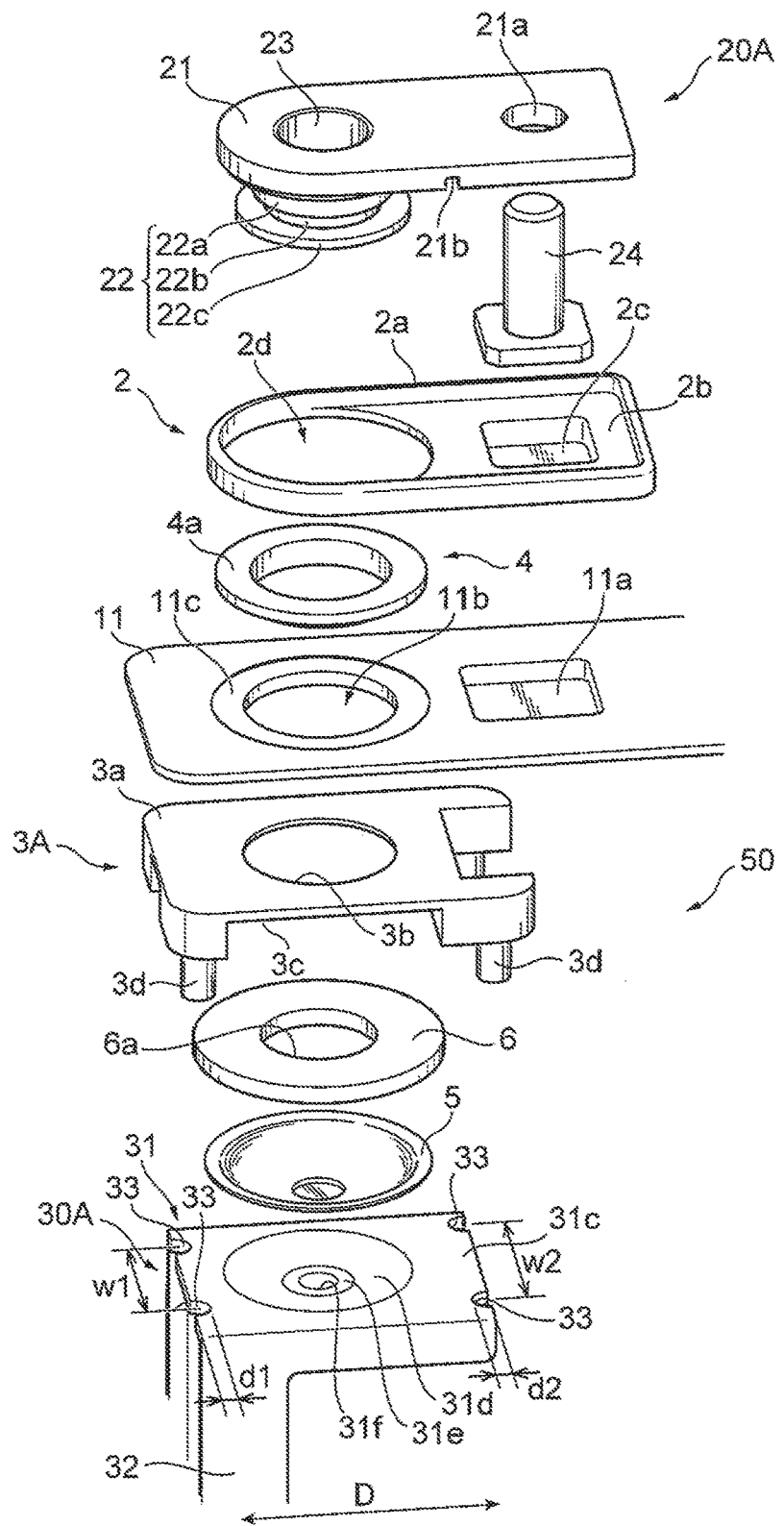
FIG. 5 is an exploded perspective view illustrating the vicinity of the current interrupting mechanism of the secondary battery of FIG. 1.

FIG. 4 is an enlarged cross-sectional view of the vicinity of the current interrupting mechanism 50 along the width direction of the secondary battery 100 of FIG. 1 (that is, the winding axis direction D of the electrode group 40). FIG. 5 is an exploded perspective view of the members in the vicinity of the current interrupting mechanism 50 of FIG. 4. Further, the electrode group 40 is omitted in FIG. 5 illustrating a state before an engaging member 3f is formed in a projection 3d of the insulating member 3A.

The current interrupting mechanism 50 contained in the battery container 10 is configured to include the collector plate 30A connected to the positive electrode 41, the diaphragm 5 connected to the base portion 31 of the collector plate 30A, and the insulating member 3A which fixes the diaphragm 5 and the base portion 31 of the collector plate 30A into the battery container 10, and forms a part of the current path between the external terminal 20A and the positive electrode 41 in the battery container 10.

The external terminal 20A is fixed to the upper surface of the battery lid 11 outside the battery container 10 through the insulating member 2 and a gasket 4 outside the battery container 10. The diaphragm 5 is fixed to the lower surface of the battery lid 11 inside the battery container 10 through the insulating member 3A and a conductive plate 6. The collector plate 30A is disposed such that the base portion 31 is fixed to the lower surface of the battery lid 11 through the insulating member 3A. The diaphragm 5 and the conductive plate 6 are disposed in a space between the base portion 31 of the collector plate 30A and the insulating member 3A.

The external terminal 20A includes a plate portion 21 which is extended in the width direction of the battery container 10 (that is, the winding axis direction D), a columnar connection portion 22 which is provided in the end on the outside in the winding axis direction D of the plate portion 21, a through hole 23 which passes through the plate portion 21 and the connection portion 22, and a bolt 24. The bolt 24 is inserted into a through hole 21a provided in the end on the inside in the winding axis direction D of the plate portion 21 from the lower surface to the upper surface of the plate portion 21. The thickness of the plate portion 21 is made partially thin by forming a groove portion 21b in a direction intersecting with the winding axis direction D (for example, along the thickness direction of the battery container 10) in the center portion in the winding axis direction D.

The connection portion 22 of the external terminal 20A includes a diameter-expanded portion 22a of which the diameter is expanded, a diameter-reduced portion 22b of which the diameter is reduced, and a caulking portion 22c of which the diameter is expanded by plastically deforming the tip of the diameter-reduced portion 22b, which are disposed in an order from the plate portion 21 to the end in an axial direction passing through the battery lid 11. The through hole 23 of the external terminal 20A passes through the external terminal 20A along the axial direction of the connection portion 22, and the upper surface of the plate portion 21 and the center portion of the caulking portion 22c are opened.

The insulating member 2 on the outside of the battery container 10 is made of an insulating resin material for example, and includes a periphery portion 2a covering a side surface of the plate portion 21 of the external terminal 20A and a bottom portion 2b tightly abutting on the bottom surface of the plate portion 21 and the upper surface of the battery lid 11. The periphery portion 2a of the insulating member 2 prevents a short circuit between the plate portion 21 and the battery lid 11 or the other members by covering the side surface of the plate portion 21. The bottom portion 2b of the insulating member 2 is disposed between the plate portion 21 of the external terminal 20A and the battery lid 11, and makes electric insulation therebetween. In the bottom portion 2b of the insulating member 2, there are provided a convex portion 2c which is engaged with a concave portion 11a provided in the upper surface of the battery lid 11, and an opening 2d through which the connection portion 22 of the external terminal 20A is inserted. The head of the bolt 24 is contained in the inside of the convex portion 2c.

The gasket 4 is made of an insulating resin material for example, and includes a cylindrical portion 4a of a cylindrical shape and a flange 4b which is provided in the end on the outer side of the battery container 10 in the width direction of the cylindrical portion 4a. The cylindrical portion 4a of the gasket 4 is inserted into a through hole 11b of the battery lid 11 in a state where the connection portion 22 of the external terminal 20A is inserted into the inside, disposed between the connection portion 22 of the external terminal 20A and an inner peripheral surface of the through hole 11b of the battery lid 11, and electrically insulates the connection portion 22 and the battery lid 11. The flange 4b of the gasket 4 is disposed in the opening 2d of the insulating member 2, engaged with a step portion 11c of a concave shape provided in the vicinity of the through hole 11b of the battery lid 11, and compressed between the step portion 11c and the bottom surface of the plate portion 21 of the external terminal 20A. Therefore, the gasket 4 tightly abuts on the concave step portion 11c and the bottom surface of the plate portion 21, and seals the through hole 11b of the battery lid 11.

The insulating member 3A on the inside of the battery container 10 is made of an insulating resin material for example, and includes a main body 3a which is extended in the width direction of the battery container 10 (that is, the winding axis direction D of the electrode group 40) and a through hole 3b which is provided in the center portion in the extending direction of the main body 3a. The main body 3a of the insulating member 3A includes a concave portion 3c which is used to dispose the conductive plate 6 and the diaphragm 5 and a plurality of projections 3d which are used to fix the base portion 31 of the collector plate 30A. In a surface facing the inner side of the battery container 10 of the concave portion 3c of the insulating member 3A, there is provided an engaging concave portion 3e which is formed in a planar shape corresponding to that of the conductive plate 6 and used to engage the conductive plate 6.

The plurality of projections 3d of the insulating member 3A protrudes in a direction of passing through the base portion 31 of the collector plate 30A (that is, the thickness direction of the base portion 31). The projection 3d is provided at a position corresponding to a notch 33 which is provided in the base portion 31 of the collector plate 30A, has a cross-sectional shape along the planar shape of the notch 33, passes through the notch 33, and is disposed along an inner peripheral surface of the notch 33. The projection 3d of this embodiment is formed in a columnar shape having a circular cross-sectional shape.

The projection 3d is disposed on the inside of the notch 33 such that a part thereof in a radial direction goes in a depth direction of the notch 33 (that is, the winding axis direction D), and is engaged with the inner peripheral surface of the notch 33. In this embodiment, a half circle portion in the radial direction of the projection 3d (that is, a half circle portion in cross-sectional view) is engaged with the notch 33 by going in the depth direction of the notch 33. The projection 3d includes the engaging member 3f which is engaged with a lower end surface 31a serving as the end surface on a side opposite to the insulating member 3A of the base portion 31 of the collector plate 30A and a side surface 31b along the thickness direction of the base portion 31.

In this embodiment, the insulating member 3A equipped with the projection 3d is formed of a thermoplastic resin material. The engaging member 3f is thermally welded to the lower end surface 31a and the side surface 31b of the base portion 31 of the collector plate 30A. The engaging member 3f is, for example, formed such that the end of the projection 3d is plasticized through the thermal welding to be enlarged in its diameter and tightly abuts on the lower end surface 31a and the side surface 31b of the base portion 31 of the collector plate 30A.

The conductive plate 6 is a plate member having a circular planar shape. Further, the planar shape of the conductive plate 6 may be formed in an elliptical shape or an oval shape such that the width direction of the battery container 10 becomes the longitudinal direction. The conductive plate 6 includes a through hole 6a through which the connection portion 22 of the external terminal 20A passes, and a circular groove 6b which is used to engage a periphery portion 5a of the diaphragm 5. The periphery portion 5a of the diaphragm 5 is bonded to the circular groove 6b of the conductive plate 6 by a laser welding for example. The conductive plate 6 is engaged with the engaging concave portion 3e of the insulating member 3A on the inside of the battery container 10, and the connection portion 22 of the external terminal 20A is inserted into the through hole 6a. The conductive plate 6 may be made of the same material as that of the external terminal 20A of the positive electrode and the collector plate 30A (for example, aluminum or an aluminum alloy).

The connection portion 22 passing through the through hole 6a of the conductive plate 6 is enlarged in diameter in a surface 6c facing the inner side of the battery container 10 of the conductive plate 6, and the caulking portion 22c is formed at the end. Therefore, the conductive plate 6 is fixed to the battery lid 11 through the insulating member 3A, and disposed between the external terminal 20A and the diaphragm 5 so as to be electrically connected thereto. Further, the surface 6c facing the inner side of the battery container 10 of the conductive plate 6 desirably has a flat surface having no libs or convex portions. When the surface 6c facing the inner side of the battery container 10 of the conductive plate 6 is flat, it is prevented that the caulking portion 22c is interfered with the libs or the convex portions. Therefore, since the diameter of the caulking portion 22c is secured, a caulking strength of the connection portion 22 of the external terminal 20A can be assured.

Further, in the secondary battery 100 of this embodiment, there is provided no current interrupting mechanism 50 between the external terminal 20B of the negative electrode and the collector plate 30B. Therefore, the external terminal 20B of the negative electrode has no through hole 23, but includes the connection portion similar to the connection portion 22 of the external terminal 20A of the positive electrode. The connection portion of the external terminal 20B of the negative electrode passes through the base portion 31 of the collector plate 30B, the end thereof is enlarged in the surface facing the inner side of the battery container 10 of the base portion 31, and the caulking portion similar to the caulking portion 22c of the connection portion 22 of the positive electrode is provided in the end. With this configuration, the external terminal 20B of the negative electrode is electrically connected to the base portion 31 of the collector plate 30B, and the base portion 31 of the collector plate 30B is fixed to the battery lid 11 through the insulating member 3B.

In this way, the external terminals 20A and 20B, the insulating member 2 on the outside of the battery container 10, the gasket 4, the insulating members 3A and 3B on the inside of the battery container 10, and the conductive plate 6 are integrally caulked and fixed to the battery lid 11. In other words, the plate portion 21 is disposed in the upper surface of the battery lid 11 on the outside of the battery container 10, and the caulking portion 22c is formed such that the connection portion 22 passes through the opening 2d of the insulating member 2 on the outside of the battery container 10, the cylindrical portion 4a of the gasket 4, the through hole 11b of the battery lid 11, the through hole 3b of the insulating member 3A on the inside of the battery container 10, and the through hole 6a of the conductive plate 6, so that the external terminal 20A of the positive electrode integrally fixes these members. In addition, an external space of the battery container 10 communicates with the space between the conductive plate 6 and the diaphragm 5 by the through hole 23 provided in the connection portion 22 of the external terminal 20A which passes through the members.

The configuration of the negative electrode is the same as that of the positive electrode except that the external terminal 20B does not include the through hole 23, the configuration of the insulating member 3B is different from that of the insulating member 3A in the positive electrode, the conductive plate 6 and the diaphragm 5 are not provided, and the connection portion of the external terminal 20B passes through the base portion 31 of the collector plate 30B to form the caulking portion.

The diaphragm 5 is disposed on the outer side of the battery container 10 from the base portion 31 of the collector plate 30A to have a convex shape facing the inner side of the battery container 10. The diaphragm 5 has a circular shape, an oval shape, or an elliptical shape corresponding to the planar shape of the conductive plate 6, and is formed in a bowl shape having a depth in the height direction of the battery container 10 perpendicular to the battery lid 11. The diaphragm 5 sequentially includes the periphery portion 5a, a side wall 5b, a bottom wall 5c, and a projection 5d in a direction from the battery lid 11 toward the bottom surface of the battery can 12 from the outer side to the inner side of the battery container 10. The diaphragm 5 may be made of the same material (for example, aluminum or an aluminum alloy) as that of the external terminal 20A of the positive electrode and the collector plate 30A.

The periphery portion 5a of the diaphragm 5 is bent along the direction parallel to the battery lid 11, engaged with the circular groove 6b formed in the surface facing the inner side of the battery container 10 of the conductive plate 6, abuts on the bottom portion of the circular groove 6b, and bonded to the conductive plate 6 by a laser welding for example. Therefore, the space outside the battery container 10 of the diaphragm 5 is separated from the inner space of the battery container 10, and communicates with the external space of the battery container 10 by the through hole 23 of the external terminal 20A.

The side wall 5b of the diaphragm 5 is extended from the periphery portion 5a toward the bottom surface 12c of the battery can 12 along the direction perpendicular to the battery lid 11, and is formed such that an angle with respect to the direction perpendicular to the battery lid 11 is smaller than that with respect to the direction parallel to the battery lid 11. The bottom wall 5c of the diaphragm 5 is extended from the end of the side wall 5b toward the center portion of the diaphragm 5 along the direction parallel to the battery lid 11, and is formed such that an angle with respect to the direction perpendicular to the battery lid 11 is larger than that with respect to the direction parallel to the battery lid 11. In addition, the surface facing the inner side of the battery container 10 of the bottom wall 5c is formed as a convex curved surface.

The projection 5d of the diaphragm 5 is formed in a shape similar to the planar shape of the diaphragm 5 in plan view, and protrudes toward the inner side of the battery container 10 in the center portion of the bottom wall 5c. The projection 5d of the diaphragm 5 is bonded to a junction 31g in the inside of a vulnerable portion 31f in a concave portion 31d of the collector plate 30A by a laser welding, a resistance welding, or an ultrasonic welding for example. Therefore, the diaphragm 5 is electrically connected to the positive electrode 41 and the external terminal 20A through the collector plate 30A and the conductive plate 6, and forms a part of the current path between the positive electrode 41 and the external terminal 20A.

As described above, the collector plate 30A of the positive electrode includes the base portion 31 which is fixed to the insulating member 3A, and the terminal portion 32 which is bonded to the collector plate junction 41d of the positive electrode 41 of the electrode group 40. The base portion 31 of the collector plate 30A includes a plurality of notches 33 through which the projections 3d of the insulating member 3A pass in the thickness direction of the base portion 31. In this embodiment, the notch 33 is formed in the outside and the inside of the base portion 31 of the collector plate 30A in the winding axis direction D of the electrode group 40.

In the winding axis direction D of the electrode group 40, the terminal portion 32 of the collector plate 30A is extended from the end on the outside of the base portion 31 and bonded to the collector plate junction 41d of the positive electrode 41 at one end of the electrode group 40. In the winding axis direction D of the electrode group 40, a depth d1 of the notch 33 on the outside of the base portion 31 of the collector plate 30A is desirably larger than a depth d2 of the notch 33 on the inside as illustrated in FIG. 5.

In addition, in this embodiment, a pair of notches 33 are provided in each of the outside and the inside of the base portion 31 of the collector plate 30A in the winding axis direction D of the electrode group 40, and an interval w1 of the pair of notches 33 on the outside is narrower than an interval w2 of the pair of notches 33 on the inside as illustrated in FIG. 5.

The concave portion 31d is formed in the upper end surface of the base portion 31 of the collector plate 30A facing the diaphragm toward the outer side of the battery container 10, and the projection 5d of the diaphragm 5 is bonded to a thin portion 31e of the bottom portion of the concave portion 31d. The concave portion 31d provided in the base portion 31 of the collector plate 30A includes an inclined surface along the convex shape of the diaphragm 5, and the vulnerable portion 31f which is broken when the diaphragm 5 is deformed in a direction to the outer side of the battery container 10. The concave portion 31d has a planar shape corresponding to the planar shape of the diaphragm 5 in plan view, and is formed in a circular planar shape for example. A method of forming the concave portion 31d is not particularly limited, and may be formed by pressing the base portion 31 of the collector plate 30A for example.

Since the concave portion 31d provided in the base portion 31 of the collector plate 30A includes the inclined surface, the thickness of the bottom wall gradually becomes thin as it goes from the periphery portion to the center portion, and the thin portion 31e is provided in the center portion surrounded by the inclined surface. The thin portion 31e is formed in a circular shape in plan view, and has an area for coming in contact with the entire bottom surface of the projection 5d of the diaphragm 5. A circular vulnerable portion 31f is provided in the center portion of the thin portion 31e, and the portion surrounded by the vulnerable portion 31f serves as the junction 31g to be bonded to the diaphragm 5. The vulnerable portion 31f is provided by a groove formed in the thin portion 31e, and has a thickness smaller than the thin portion 31e. The bottom surface of the projection 5*d* of the diaphragm 5 abuts on the thin portion 31*e* on the outside of the vulnerable portion 31*f*, but not bonded.

Next, the description will be made about a procedure that the projection 3*d* of the insulating member 3A passes through the notch 33 of the base portion 31 of the collector plate 30A and the engaging member 3*f* is formed in the projection 3*d*.

Figure 6:
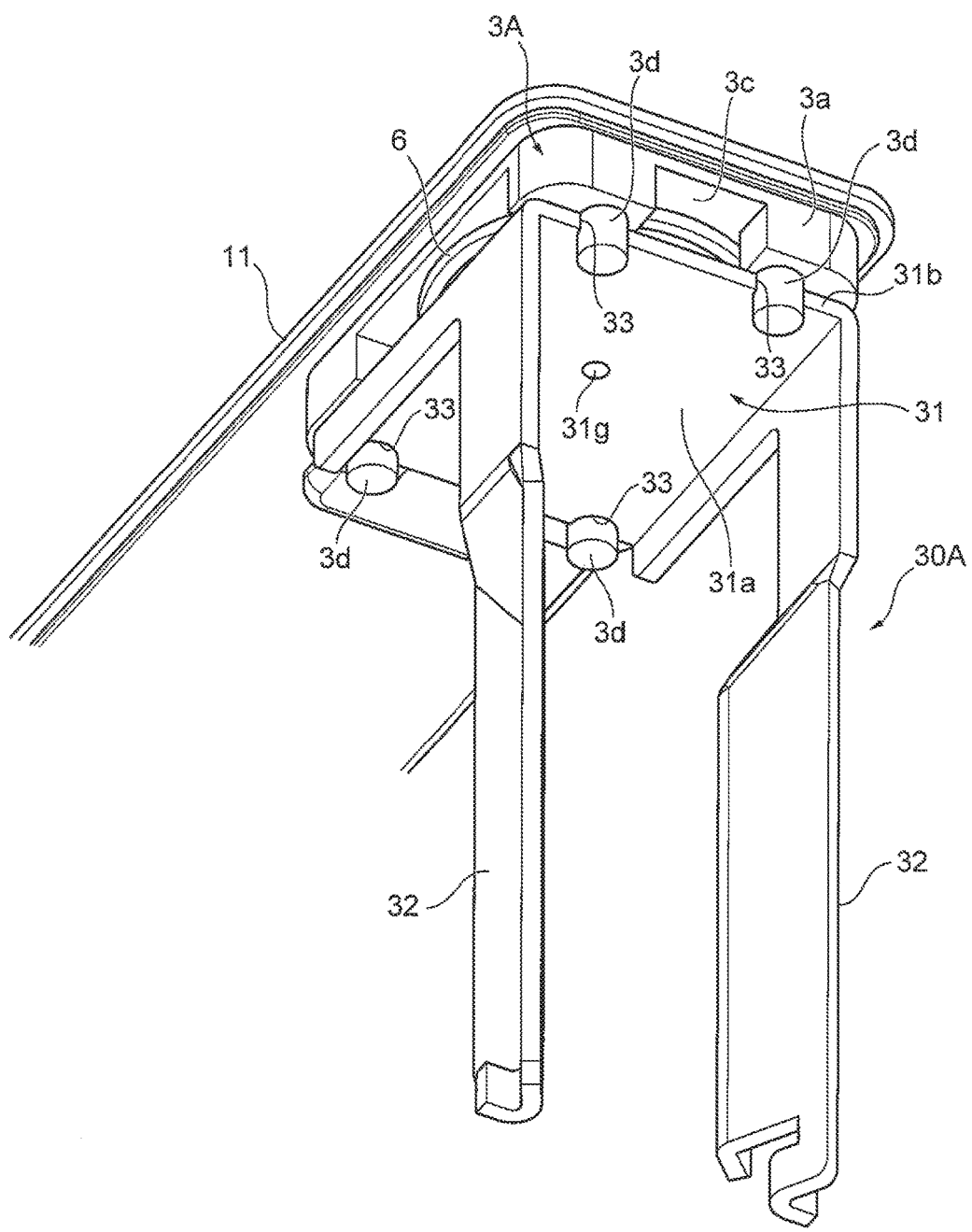
FIG. 6 is a perspective view illustrating a state where members in the vicinity of the current interrupting mechanism of FIG. 5 are assembled.
Figure 7:
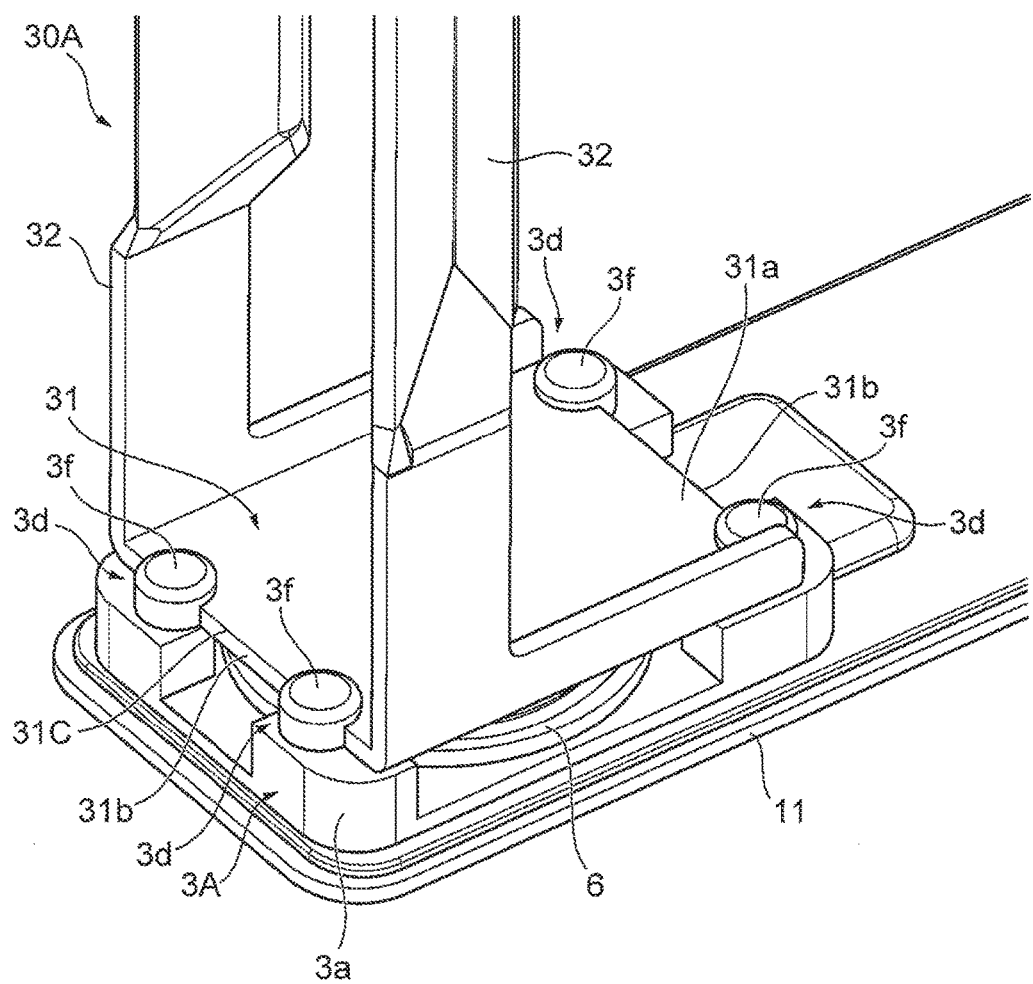
FIG. 7 is a perspective view illustrating a state where a projection of an insulating member of FIG. 6 is thermally welded to a base portion of a collector plate.
Figure 8A:
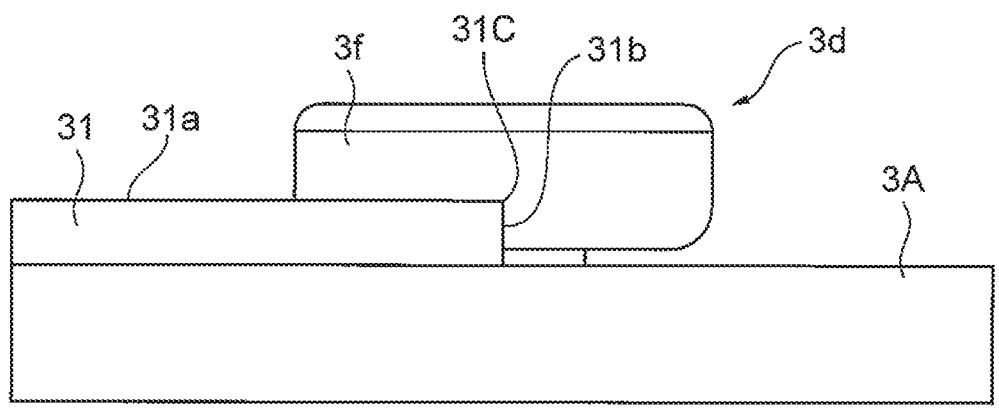
FIG. 8A is an enlarged side view of the projection of FIG. 7.
Figure 8B:
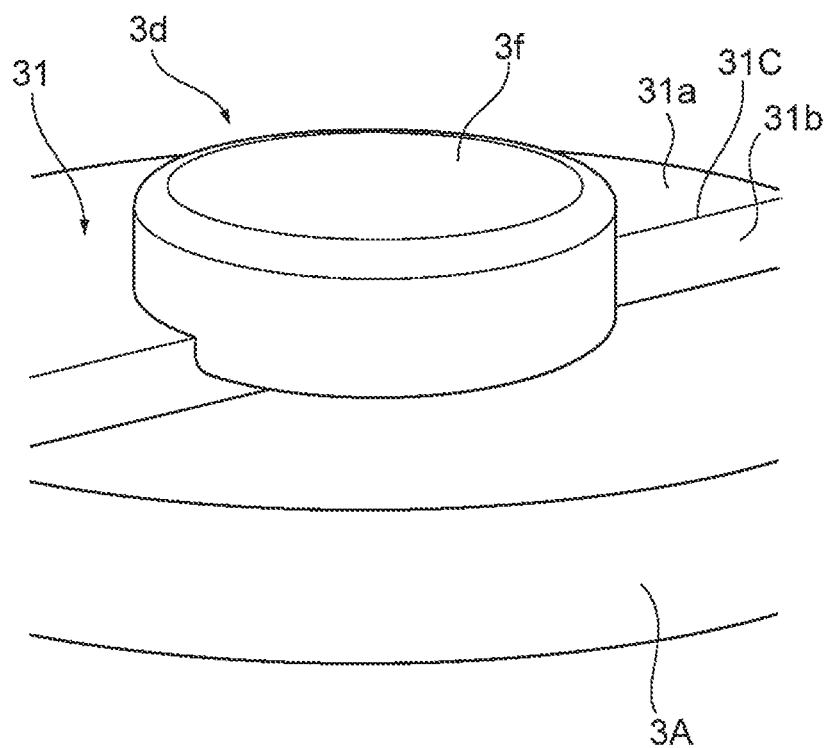
FIG. 8B is an enlarged perspective view of the projection of FIG. 7.

FIG. 6 is a perspective view illustrating a state where the projection 3*d* of the insulating member 3A passes through the notch 33 of the base portion 31 of the collector plate 30A. FIG. 7 is a perspective view illustrating a state where the engaging member 3*f* is formed in the projection 3*d* passed through the notch 33 of the base portion 31 of the collector plate 30A. FIG. 8A is an enlarged side view of the projection 3*d* where the engaging member 3*f* is formed, and FIG. 8B is an enlarged perspective view of the projection 3*d* where the engaging member 3*f* is formed.

First, as illustrated in FIG. 4, the connection portion 22 of the external terminal 20A passes through the opening 2*d* of the insulating member 2 on the outside of the battery container 10, the cylindrical portion 4*a* of the gasket 4, the through hole 3*b* of the insulating member 3A on the inside of the battery container 10, and the through hole 6*a* of the conductive plate 6. Then, the caulking portion 22*c* is formed at the end of the connection portion 22, and the external terminal 20A, the insulating member 2, the gasket 4, the insulating member 3A, and the conductive plate 6 are integrally caulked and fixed to the battery lid 11, and the periphery portion 5*a* of the diaphragm 5 is bonded to the circular groove 6*b* of the conductive plate 6.

Next, as illustrated in FIG. 6, the projection 3*d* of the insulating member 3A passes through the notch 33 of the base portion 31 of the collector plate 30A in the thickness direction of the base portion 31. Then, the end portion of the projection 3*d* is plasticized to be enlarged by pressing that portion with a heating jig for example so as to tightly abut on the lower end surface 31*a* and the side surface 31*b* of the base portion 31 of the collector plate 30A. Thereafter, the projection is engaged with the lower end surface 31*a* and the side surface 31*b* of the base portion 31 of the collector plate 30A by curing the end portion of the projection 3*d* as illustrated in FIGS. 7 and 8, and the engaging member 3*f* thermally welded to the lower end surface 31*a* and the side surface 31*b* is formed.

Therefore, the engaging member 3*f* is thermally welded to a corner portion 31C which is formed at the boundary between the lower end surface 31*a* and the side surface 31*b*, and thermally welded to the lower end surface 31*a* and the side surface 31*b* adjacent to the corner portion 31C. In addition, the engaging member 3*f* tightly abuts on the lower end surface 31*a* and the side surface 31*b*, and goes into a state of abutting on the lower end surface 31*a* and the side surface 31*b*.

Hereinafter, an operation of the secondary battery 100 of this embodiment will be described.

As described above, the secondary battery 100 of this embodiment includes the current interrupting mechanism 50 which is provided in the current path between the external terminal 20A and the positive electrode 41 in the battery container 10 and contained in the battery container 10, and includes the diaphragm 5 connected to the external terminal 20A and the collector plate 30A connected to the positive electrode 41. In addition, the surface on the inner side of the battery container 10 of the diaphragm 5 faces the inner space of the battery container 10, and the space on the outer side of the battery container 10 of the diaphragm 5 communicates with the external space of the battery container 10.

With such a configuration, the secondary battery 100 of this embodiment accumulates power supplied through the external terminals 20A and 20B in the electrode group 40 at normal time by the current flowing in the current path containing the current interrupting mechanism 50. In addition, the secondary battery 100 supplies the power accumulated in the electrode group 40 to an external machine through the external terminals 20A and 20B by the current flowing in the current path containing the current interrupting mechanism 50.

For example, when a gas pressure in the battery container 10 is increased by overcharging, overheating, or a damage caused by an external force in the secondary battery 100, a pressure operated on the surface on the inner side of the battery container 10 of the diaphragm 5 becomes larger than that operated on the surface on the outer side of the battery container 10. Then, when the gas pressure in the battery container 10 reaches a predetermined pressure, the diaphragm 5 is plastically deformed to be buckled toward the outer side of the battery container 10, a force toward the outer side of the battery container 10 is operated on the junction 31*g* of the collector plate 30A bonded to the projection 5*d* of the diaphragm 5 so as to break the vulnerable portion 31*f*. Therefore, the connection between the diaphragm 5 and the base portion 31 of the collector plate 30A is broken, and the current path between the external terminal 20A and the positive electrode 41 in the battery container 10 is interrupted.

Figure 12A:
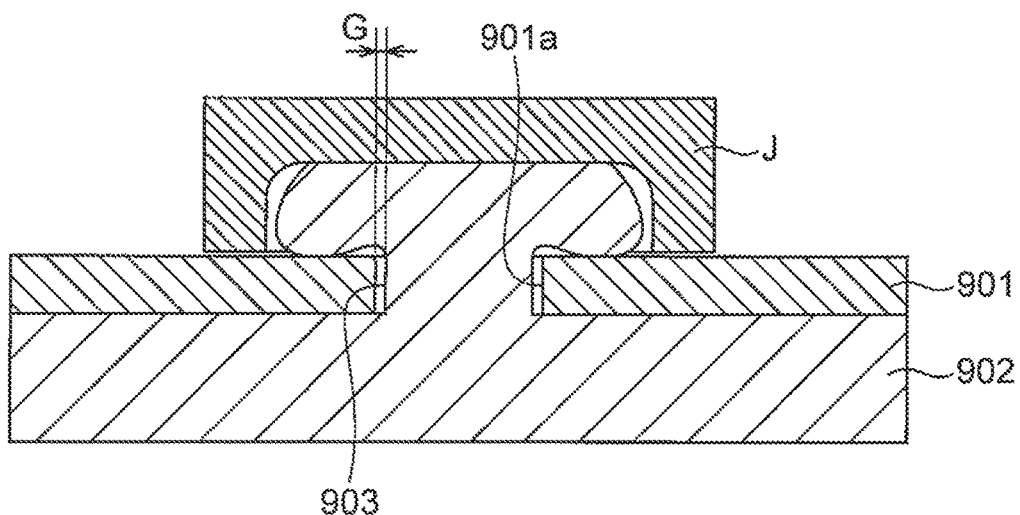
FIG. 12A is an enlarged cross-sectional view for describing a fixation of the collector plate to an insulating member in a conventional secondary battery.
Figure 12B:
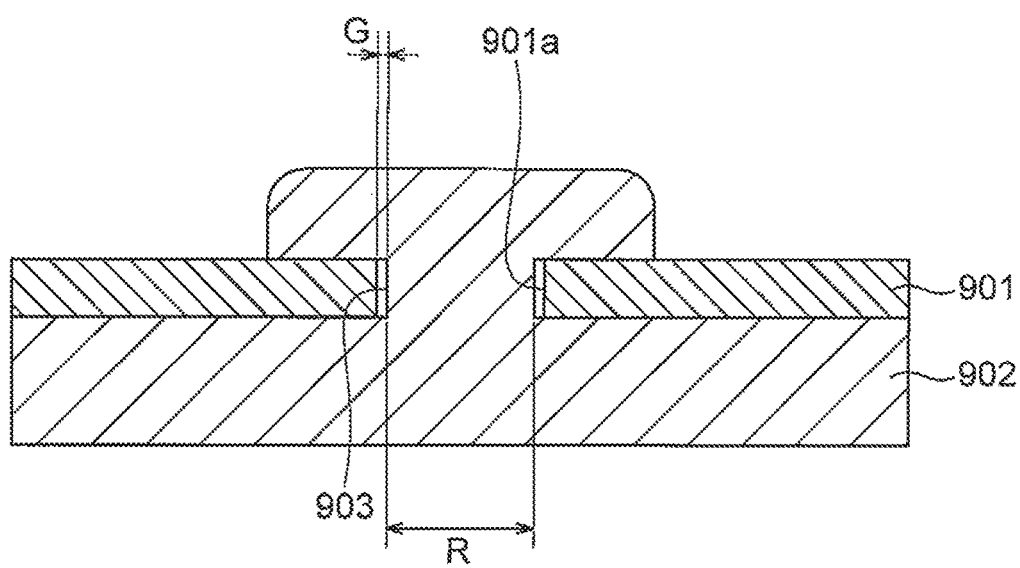
FIG. 12B is an enlarged cross-sectional view for describing a fixation of the collector plate to the insulating member in the conventional secondary battery.

As illustrated in FIG. 12, in the conventional secondary battery, the diameter of the through hole 901*a* is set to be one size larger than that of a boss 903 since the boss 903 of an electric collector holder 902 passes a through hole 901*a* of a pedestal 901 of an electric collector, and a gap G in the radial direction is generated between an inner peripheral surface of the through hole 901*a* and an outer peripheral surface of the boss 903. It is difficult to fill such a gap G by a thermally caulking process of the boss 903 using a heating jig J as illustrated in FIG. 12A. Therefore, the gap G in the radial direction is left between the inner peripheral surface of the through hole 901*a* and the outer peripheral surface of the boss 903 even after the thermally caulking process as illustrated in FIG. 12B. Therefore, the pedestal 901 of the electric collector vibrates in a diameter direction R of the boss 903, and the vibration is applied to an interrupting mechanism to cause an erroneous operation of the interrupting mechanism.

With this regard, the secondary battery 100 of this embodiment includes the projection 3*d* which is formed by projecting the insulating member 3A in the battery container 10 in the thickness direction of the base portion 31 of the collector plate 30A, and the base portion 31 of the collector plate 30A includes the notch 33 through which the projection 3*d* passes in the thickness direction. Then, the projection 3*d* includes the engaging member 3*f* through which the lower end surface 31*a* and the side surface 31*b* of the base portion 31 of the collector plate 30A are engaged.

With this configuration, since the base portion 31 of the collector plate 30A is held between the insulating member 3A and the engaging member 3*f*, it is prevented that the collector plate 30A vibrates in the thickness direction of the base portion 31. Further, since the side surface 31*b* of the base portion 31 of the collector plate 30A is fixedly supported by the engaging member 3*f*, it is prevented that the collector plate 30A vibrates in the radial direction of the projection 3*d*. Therefore, the vibration applied from the collector plate 30A to the current interrupting mechanism 50 can be suppressed more surely. For example, it is possible to prevent a malfunction of the current interrupting mechanism 50 which is caused by the breaking of the vulnerable portion 31f due to the vibration of the collector plate 30A.

In addition, the projection 3d of the insulating member 3A is formed of a thermoplastic resin material. Then, the engaging member 3f of the projection 3d is thermally welded to the lower end surface 31a and the side surface 31b of the base portion 31 of the collector plate 30A. With this configuration, since the engaging member 3f tightly abuts on the lower end surface 31a and the side surface 31b of the base portion 31 of the collector plate 30A, it is possible to eliminate a gap. Further, since the base portion 31 of the collector plate 30A can be fixedly supported by the engaging member 3f, it is possible to suppress the vibration of the collector plate 30A.

In addition, the engaging member 3f is thermally welded to the corner portion 31C between the lower end surface 31a and the side surface 31 of the base portion 31 of the collector plate 30A. Therefore, the corner portion 31C of the base portion 31 can be fixedly supported with strength by the engaging member 3f. In addition, the lower end surface 31a and the side surface 31 can be fixedly supported with strength over the corner portion 31C of the base portion 31 by the engaging member 3f, and the vibration of the collector plate 30A can be effectively suppressed.

In addition, the end of the projection 3d is enlarged to form the engaging member 3f of the projection 3d. With this configuration, the strength of the projection 3d with respect to a force on the projection 3d in the axial direction compared to a case where the diameter of the engaging member 3f is made to be equal to that of the projection 3d or to be smaller than that of the projection 3d. In addition, a contact area of the engaging member 3f with respect to the lower end surface 31a and the side surface 31b of the base portion 31 of the collector plate 30A is increased to fixedly support the collector plate 30A with strength still more, so that the vibration of the collector plate 30A can be more effectively suppressed.

In addition, the secondary battery 100 includes the electrode group 40 in which the positive electrode 41 and the negative electrode 42 are stacked with the separators 43 and 44 alternately interposed therebetween and wound about the winding axis direction D. Then, the collector plates 30A and 30B are disposed at the end in the winding axis direction D of the electrode group 40.

With such a configuration, the electrode group 40 is supported by the collector plates 30A and 30B in the battery container 10, and faces the wide side surface 12b of the battery container 10 through the separator 44 and the insulating sheet in a state where there is substantially no gap in the thickness direction perpendicular to the plan surface 40a. On the other hand, the electrode group 40 includes a certain space with respect to the narrow side surface 12d of the battery container 10 in the winding axis direction D. Therefore, for example, when an inertia force or a vibration operates on the secondary battery 100, the electrode group 40 easily vibrates in the winding axis direction D rather than in the thickness direction.

Herein, in the secondary battery 100 of this embodiment, the notches 33 of the base portion 31 of the collector plate 30A are formed on the outside and the inside of the base portion 31 in the winding axis direction D. For this reason, even if a gap is generated between the inner peripheral surface of the notch 33 and the outer peripheral surface of the projection 3d, the side surface 31b on the outside or the inside in the winding axis direction D of the base portion 31 of the collector plate 30A can be fixedly supported by the engaging member 3f which tightly abuts on the side surface 31b. Therefore, the base portion 31 of the collector plate 30A can be fixedly supported with strength in the winding axis direction D where the electrode group 40 is comparatively easy to vibrate, and the vibration of the collector plate 30A can be effectively suppressed.

In addition, the collector plate 30A includes the terminal portion 32 which is extended from the end on the outside in the winding axis direction D of the base portion 31 and connected to the positive electrode 41 at the end in the winding axis direction D of the electrode group 40. Therefore, when an inertia force or a vibration operates on the secondary battery 100, a load from the electrode group 40 operates more on the outside rather than the inside in the winding axis direction D of the base portion 31 of the collector plate 30A.

Herein, in the secondary battery 100 of this embodiment, the depth d1 of the notch 33 on the outside of the base portion 31 of the collector plate 30A in the winding axis direction D is larger than the depth d2 of the notch 33 on the inside. Therefore, a contact area between the engaging member 3f of the projection 3d and the lower end surface 31a of the base portion 31 of the collector plate 30A is increased, and the base portion 31 is fixedly supported with strength in the axial direction of the projection 3d, so that the vibration of the collector plate 30A can be effectively suppressed.

The description of a relation between the depths d1 and d2 of the notch 33, the contact area between the engaging member 3f of the projection 3d and the lower end surface 31a of the base portion 31 of the collector plate 30A, and a contact length with respect to the side surface 31b of the base portion 31 will be made using FIG. 9.

FIG. 9 is an enlarged plan view of the notch 33 when viewed in a direction perpendicular to the lower end surface 31a of the collector plate 30A.

In the example illustrated in FIG. 9, the planar shape of the notch 33 is an arc, and the planar shapes of the projection 3d and the engaging member 3f are circles. As illustrated in FIG. 9B, a contact area CA between the engaging member 3f and the lower end surface 31a of the base portion 31 of the collector plate 30A becomes larger in a case where the depth d of the notch 33 is equal to the radius of the projection 3d compared to a case where the depth d of the notch 33 is smaller than the radius of the projection 3d as illustrated in FIG. 9A.

Figure 9A:
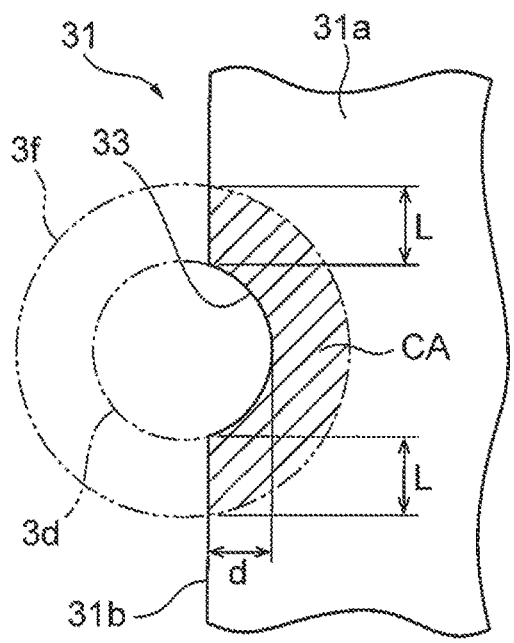
FIG. 9A is an enlarged plan view illustrating an example of a notch of the base portion of the collector plate.
Figure 9B:
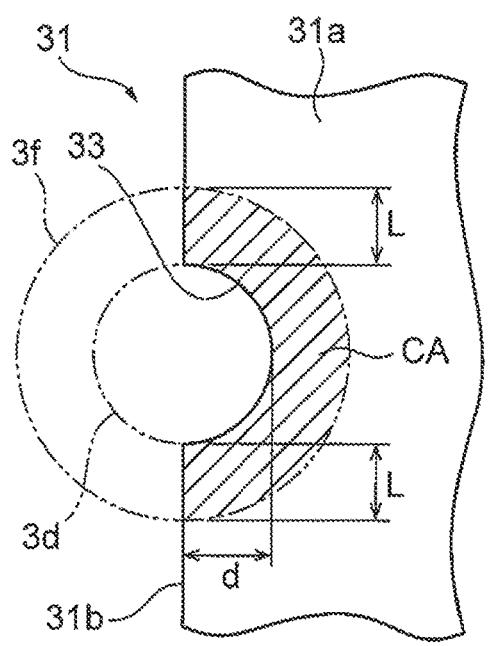
FIG. 9B is an enlarged plan view illustrating an example a notch of the base portion of the collector plate.
Figure 9C:
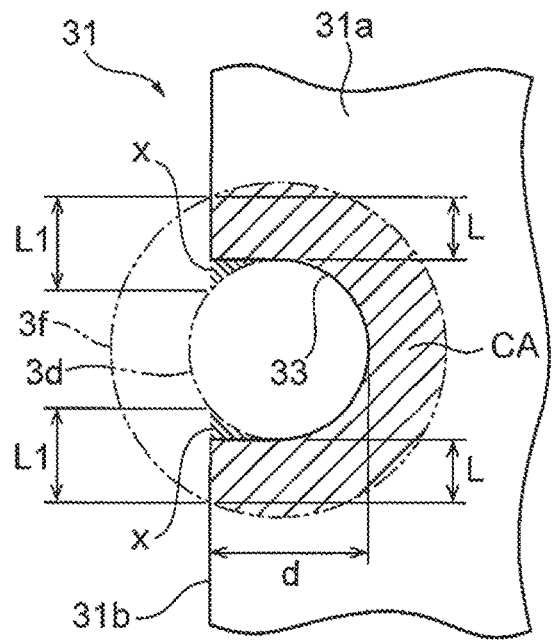
FIG. 9C is an enlarged plan view illustrating an example of a notch of the base portion of the collector plate.
Figure 9D:
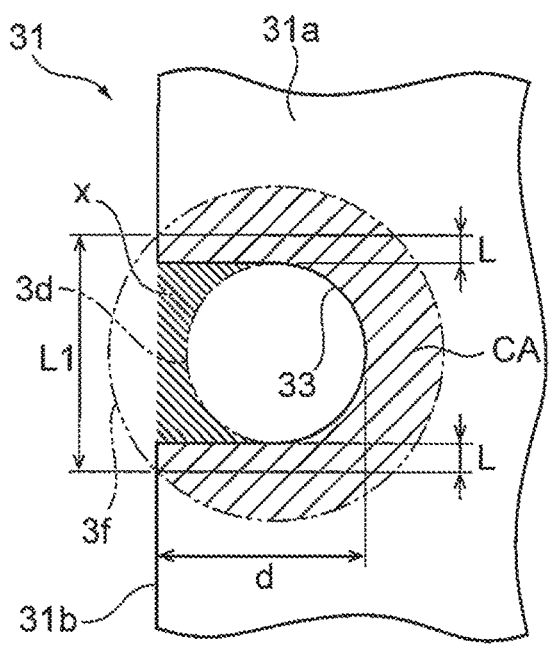
FIG. 9D is an enlarged plan view illustrating an example of a notch of the base portion of the collector plate.

In addition, the contact area CA between the engaging member 3f and the lower end surface 31a of the base portion 31 becomes larger in a case where the depth d of the notch 33 is larger than the radius of the projection 3d as illustrated in FIG. 9C compared to the example illustrated in FIG. 9B. Furthermore, the contact area CA between the engaging member 3f and the lower end surface 31a of the base portion 31 becomes larger in a case where the depth d of the notch 33 is equal to or more than the diameter of the projection 3d as illustrated in FIG. 9D compared to the example illustrated in FIG. 9C.

In this way, the base portion 31 can be fixedly supported in the axial direction of the projection 3d with strength further more by increasing the contact area CA between the engaging member 3f and the lower end surface 31a of the base portion 31, and the vibration of the collector plate 30A can be more effectively suppressed. Further, in the examples illustrated in FIGS. 9C and 9D, the contact area CA between the engaging member 3f and the lower end surface 31a of the base portion 31 may be further increased by not notching but leaving an area X of the base portion 31 of the collector plate 30A. However, in this case, there is a need to insert the projection 3d to the notch 33 in the axial direction, and a dimensional tolerance is necessarily increased compared to a case where the projection 3d is engaged with the notch 33 in the radial direction.

In addition, an engagement length L between the engaging member 3f and the side surface 31b of the base portion 31 of the collector plate 30A is desirably increased from the viewpoint of suppressing the vibration of the projection 3d in the radial direction. As illustrated in FIG. 9B, the engagement length L between the engaging member 3f and the side surface 31b of the base portion 31 of the collector plate 30A becomes longer in a case where the depth d of the notch 33 is equal to the radius of the radius of the projection 3d compared to a case where the depth d of the notch 33 is smaller than the radius of the projection 3d as illustrated in FIG. 9A.

However, the engagement length L between the engaging member 3f and the side surface 31b of the base portion 31 becomes short in a case where the depth d of the notch 33 is larger than the radius of the projection 3d as illustrated in FIG. 9C compared to the example illustrated in FIG. 9B. Furthermore, the engagement length L between the engaging member 3f and the side surface 31b of the base portion 31 becomes short in a case where the depth d of the notch 33 is equal to or more than the diameter of the projection 3d as illustrated in FIG. 9D compared to the example illustrated in FIG. 9C.

Therefore, the depth d of the notch 33 is desirably made to be equal to the radius of the projection 3d from the viewpoint of increasing the engagement length L between the engaging member 3f and the side surface 31b of the base portion 31 while sufficiently securing the contact area CA between the engaging member 3f of the projection 3d and the lower end surface 31a of the base portion 31 of the collector plate 30A. Further, in the examples illustrated in FIGS. 9C and 9D, an engagement length L1 between the engaging member 3f and the lower end surface 31a of the base portion 31 may be increased while not notching but leaving the portion of the area X of the base portion 31 of the collector plate 30A.

In addition, as illustrated in FIGS. 9A and 9B, the projection 3d can be easily engaged in the depth direction d of the notch 33 in a case where the depth d of the notch 33 is equal to or less than the projection 3d. Therefore, it is possible to make a small gap between the outer peripheral surface of the projection 3d and the inner peripheral surface of the notch 33 by reducing a dimensional tolerance. In addition, the secondary battery 100 can be easily assembled since the projection 3d is moved in the radial direction to be engaged with the notch 33.

Further, even in a case where the depth d of the notch 33 is equal to or more than the radius of the projection 3d as illustrated in FIGS. 9C and 9D, the same effect as that in a case where the depth d of the notch 33 is equal to or less than the radius of the projection 3d can be obtained when the notch 33 has an opening width equal to or more than the radius of the projection 3d in the side surface 31b of the base portion 31 of the collector plate 30A by notching the portion of the area X for example.

In addition, in the secondary battery 100 of this embodiment, as illustrated in FIG. 5, a pair of notches 33 are provided on the outside and the inside in the winding axis direction D of the base portion 31 of the collector plate 30A, and the interval w1 of the pair of notches 33 on the outside is set to be narrower than the interval w2 of the pair of notches 33 on the inside. Therefore, it is possible to provide a clearance between the terminal portion 32 provided on the outside in the winding axis direction D of the base portion 31 of the collector plate 30A and the projection 3d engaged with the notch 33. The thermal welding to the lower end surface 31a and the side surface 31b of the base portion 31 becomes easy by forming the engaging member 3f.

In addition, since the diaphragm 5 has a convex bowl shape, a mechanical strength until the gas pressure in the battery container 10 reaches a predetermined pressure is improved compared to a case where the diaphragm 5 is formed in a planar shape. Further, an erroneous operation of the diaphragm 5 can be prevented. In addition, the surface area of the diaphragm 5 can be made large. Thus, when the gas pressure in the battery container 10 reaches the predetermined pressure, the diaphragm 5 is inversely deformed and responsiveness of the deformation to the pressure can be improved.

In addition, the external terminal 20A includes the through hole 23 which communicates between the space on the outer side of the battery container 10 of the diaphragm 5 and the external space of the battery container 10. With this configuration, when the gas pressure in the battery container 10 is increased, it is possible to generate a pressure difference between the pressure operating on the surface on the inner side of the battery container 10 of the diaphragm 5 and the pressure operating on the surface on the outer side of the battery container 10. Therefore, the current path between the positive electrode 41 and the external terminal 20A can be easily and securely interrupted by easily and securely deforming the diaphragm 5 toward the outside of the battery container 10.

In addition, the secondary battery 100 of this embodiment includes the conductive plate 6 between the external terminal 20A and the diaphragm 5 to bond the diaphragm 5 and the periphery portion 5a. Then, the external terminal 20A includes the connection portion 22 which passes through the battery container 10 and the conductive plate 6. Furthermore, the connection portion 22 includes the caulking portion 22c which is enlarged in the surface 6c toward the inner side of the battery container 10 of the conductive plate 6, and the through hole 23 which communicates to the space between the conductive plate 6 and the diaphragm 5. With this configuration, the diaphragm 5 is disposed in the battery container 10 to be electrically connected to the external terminal 20A, the surface on the inner side of the battery container 10 of the diaphragm 5 faces the inner space of the battery container 10, and the space between the conductive plate 6 on the outer side of the battery container 10 of the diaphragm 5 communicates with the external space of the battery container 10. Therefore, the current path between the positive electrode 41 and the external terminal 20A can be easily and securely interrupted by easily and securely deforming the diaphragm 5 toward the outside of the battery container 10.

In addition, the diaphragm 5 is disposed between the external terminal 20A of the positive electrode and the collector plate 30A, and is made of aluminum or an aluminum alloy. Therefore, the diaphragm 5 can be easily deformed by lowering the mechanical strength of the material of the diaphragm 5 compared to a case where the diaphragm made of copper or a copper alloy is disposed between the external terminal 20B of the negative electrode and the collector plate 30B. Accordingly, the current path between the positive electrode 41 and the external terminal 20A can be easily and securely interrupted. Further, the current interrupting mechanism 50 may be provided in the negative electrode.

In addition, when the diaphragm 5 is deformed to interrupt the current path between the positive electrode 41 and the external terminal 20A by the current interrupting mechanism 50 and then the gas pressure in the battery container 10 is increased, the gas exhaust valve 13 is cleaved and the gas in the battery container 10 is discharged to the outside. With this configuration, it is possible to secure safety of the secondary battery 100.

As described above, according to the secondary battery 100 of this embodiment, the projection 3d of the insulating member 3A includes the engaging member 3f which is engaged with the lower end surface 31a and the side surface 31b of the base portion 31 of the collector plate 30A, so that the vibration added to the current interrupting mechanism 50 can be securely suppressed.

Second Embodiment

Next, a second embodiment of the secondary battery of the invention will be described using FIG. 10 together with FIGS. 1 to 9.

Figure 10:
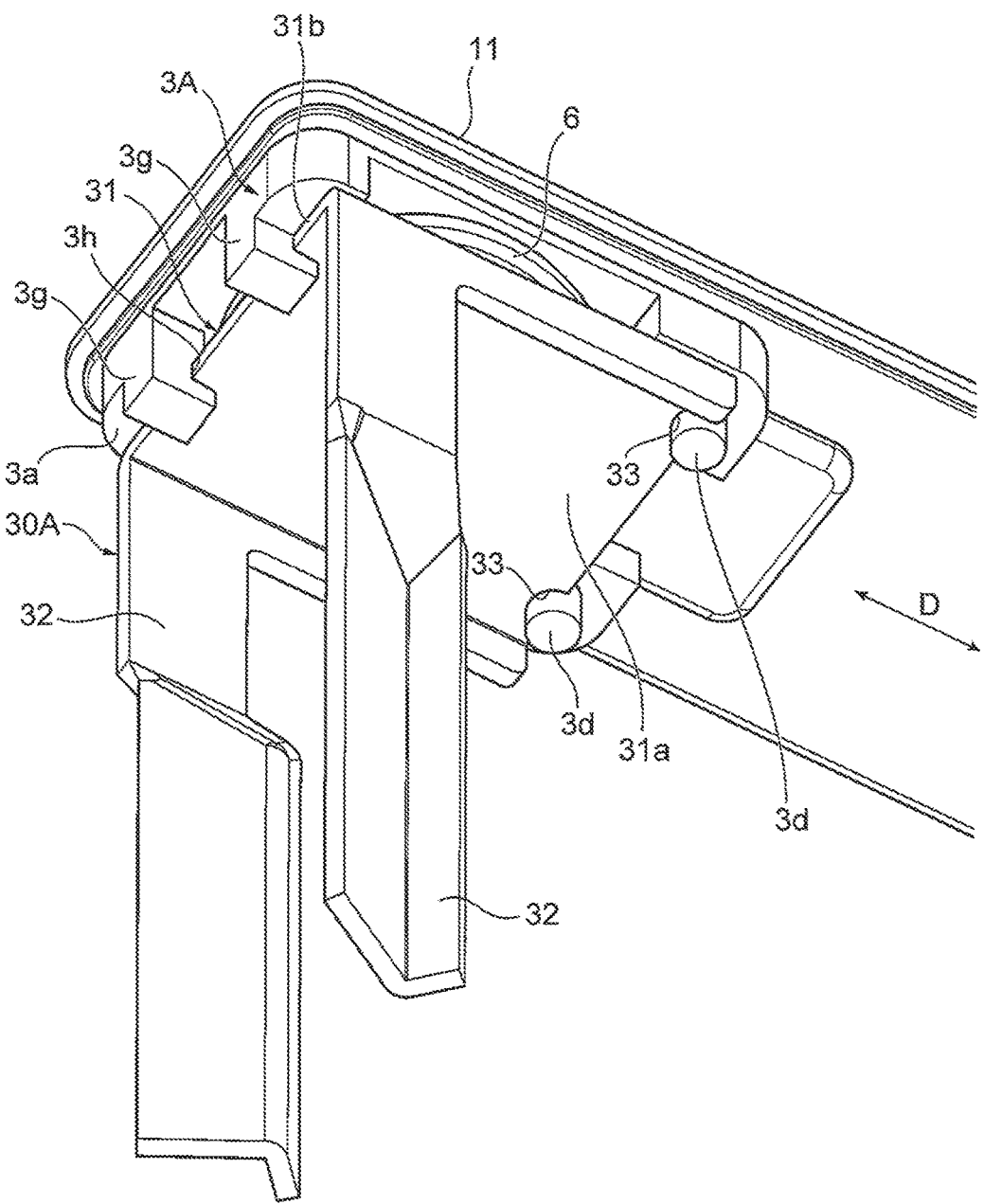
FIG. 10 is a perspective view of a secondary battery according to a second embodiment of the invention corresponding to FIG. 6.

FIG. 10 is a perspective view corresponding to FIG. 6 of the first embodiment, illustrating a state where the projection 3d of the insulating member 3A passes through the notch 33 of the base portion 31 of the collector plate 30A of the secondary battery of this embodiment.

The secondary battery of this embodiment is different from the secondary battery 100 of the first embodiment in that the notch 33 is provided only in the side surface 31b on the inside in the winding axis direction D of the base portion 31 of the collector plate 30A, and the insulating member 3A includes a support convex portion 3g which fixedly supports the lower end surface 31a and the side surface 31b of the base portion 31 of the collector plate 30A on the outside in the winding axis direction D. The other configurations of the secondary battery of this embodiment are the same as those of the secondary battery 100 of the first embodiment, and thus the same portions will be attached with the same symbols and the descriptions thereof will be omitted.

The insulating member 3A of the secondary battery of this embodiment includes a pair of projections 3d on the inside in the winding axis direction D of the electrode group 40, and includes a pair of support convex portions 3g on the outside in the winding axis direction D. The support convex portion 3g is perpendicular to the battery lid 11 and formed in an L shape in cross-sectional view along the winding axis direction D, and includes an engaging groove 3h which is opened in portions on the inside in the winding axis direction D and in the thickness direction of the electrode group 40.

When the collector plate 30A is fixed to the insulating member 3A, the end on the outside in the winding axis direction D of the base portion 31 of the collector plate 30A is first approached to the engaging groove 3h of the support convex portion 3g, and the base portion 31 is inserted into the engaging groove 3h up to reach the inmost portion so as to be engaged in a state where the base portion 31 is inclined with respect to the battery lid 11. Next, the end on the inside in the winding axis direction D of the base portion 31 of the collector plate 30A is fallen to approach the insulating member 3A, the projection 3d is engaged along the notch 33, and the base portion 31 is disposed on the insulating member 3A to be substantially parallel to the battery lid 11. Thereafter, similarly to the first embodiment, the collector plate 30A is fixed to the insulating member 3A by forming the engaging member 3f in the projection 3d.

According to the secondary battery of this embodiment, the same effect as that of the secondary battery 100 of the first embodiment is obtained. Furthermore, the process of forming the engaging member 3f at the end of the projection 3d is decreased, the productivity can be improved. In addition, since the support convex portion 3g can be formed in the insulating member 3A in advance, there is no need to thermally weld the support convex portion 3g to the base portion 31 of the collector plate 30A. Therefore, it is possible to improve the flexibility in design such as a cross-sectional area of the support convex portion 3g and a contact area with the base portion 31. Therefore, the lower end surface 31a and the side surface 31b of the base portion 31 of the collector plate 30A can be fixedly supported with strength by the support convex portion 3g, and the vibration of the collector plate 30A can be effectively suppressed.

In addition, the base portion 31 of the collector plate 30A of the secondary battery of this embodiment includes the notch 33 in the side surface 31b on the inside in the winding axis direction D, the insulating member 3A includes the projection 3d on the inside in the winding axis direction D of the electrode group 40, and includes the support convex portion 3g on the outside in the winding axis direction D. Then, the support convex portion 3g includes the engaging groove 3h of which the inside in the winding axis direction D is opened.

Therefore, as described above, when the projection 3d is engaged along the notch 33 of the base portion 31 of the collector plate 30A after being inserted into the engaging groove 3h up to reach the inmost portion, it is possible to eliminate the gap in the radial direction of the support convex portion 3g which is generated between the base portion 31 of the collector plate 30A and the support convex portion 3g. Furthermore, when the engaging member 3f is formed in the projection 3d in this state, the engaging member 3f is engaged with the side surface 31b on the inside in the winding axis direction D of the base portion 31 of the collector plate 30A without a gap, and the movement in the winding axis direction D of the base portion 31 is restricted.

Therefore, according to the secondary battery of this embodiment, the lower end surface 31a and the side surface 31b of the base portion 31 of the collector plate 30A can be fixedly supported by the support convex portion 3g and the projection 3d, and the vibration of the collector plate 30A can be suppressed.

Hitherto, the embodiments of the invention have been described using the drawings, and specific configurations are not limited to the embodiments. Changes are only within a range of simple variation in design, which belong to the invention.

For example, the description in the first embodiment has been made about that the base portion 31 of the collector plate 30A is configured to include the pair of notches 33 on the inside and the outside in the winding axis direction D, but the layout of the notches 33 is not limited thereto. FIGS. 11A and 11B illustrate other examples of the layout of the notches 33.

For example, the plan surface 40a of the electrode group 40 tightly abuts on the wide side surface 12b of the battery can 12 through the separator 44 and the insulating sheet. In such case where the electrode group 40 does not vibrate in the thickness direction, the notch 33 and the projection 3d may be provided one by one on the inside and the outside in the winding axis direction d of the base portion 31 of the collector plate 30A as illustrated in FIG. 11A. In addition, even in a case where the notches 33 are provided one by one on the inside and the outside in the winding axis direction D of the base portion 31 of the collector plate 30A, the notch 33 may be further provided on one side in the thickness direction of the electrode group 40 of the base portion 31 as illustrated in FIG. 11B.

In this case, a force is applied to the base portion 31 of the collector plate 30A from the side surface 31b having no notch 33 in the thickness direction of the electrode group 40 toward the opposite side surface 31b formed with the notch 33, and the outer peripheral surface of the projection 3d is pressed to the inner peripheral surface of the notch 33 on both sides in the winding axis direction D so as to eliminate the gap. In this state, the vibration of the base portion 31 in the winding axis direction D is restricted by the engaging members 3f on both sides in the winding axis direction D by forming the engaging member 3f in each projection 3d, and the vibration of the base portion 31 in the thickness direction of the electrode group 40 is restricted by the engaging member 3f in the thickness direction of the electrode group 40 and the projections 3d on both sides in the winding axis direction D.

In addition, the description has been made about a case where a plurality of projections and notches are provided in the above embodiment. However, for example, in a case where the support convex portion is provided in the insulating member, the projection and the notch may be provided by one.

In addition, the above embodiment has been described about a case where the projection has a columnar shape and the notch has an arc planar shape. However, the cross-sectional shape of the projection is not limited to a circle, and may be an elliptical shape, an oval shape, a track field shape having arcs and straight lines, or a polygon. In this case, the planar shape of the notch may be formed in a shape corresponding to the cross-sectional shape of the projection. In addition, the projection may be formed in a shape having different diameters of the end and the base such as a corn and a pyramid.

In addition, in the above embodiment, the engaging member has been described to be formed by enlarging the end of the projection. However, the engaging member may have the same diameter as that of the other portions in the projection or the diameter may be reduced compared to the other portions of the projection as long as the engaging member is engaged with the end surface on a side opposite to the insulating member of the base portion of the collector plate and the side surface along the thickness direction. For example, the end portion is reduced in diameter compared to the base portion of the projection, and only the end portion of the projection passes through the base portion of the collector plate so as to provide the notch, and the end portion of the projection is deformed after the notch of the base portion of the collector plate passes through the notch to form the engaging member, so that the engaging member can be formed without increasing the diameter of the end of the projection compared to the other portions.

In addition, the above embodiment has been described about a configuration that the projection is formed of a thermoplastic resin material, and the engaging member is thermally welded to the end surface and the side surface of the base portion of the collector plate. However, the secondary battery of the invention may be configured such that the engaging member is not thermally welded to the end surface and the side surface of the base portion of the collector plate as long as the engaging member is formed to engage the end surface and the side surface of the base portion of the collector plate by deforming the end of the projection after passing the notch to engage. For example, the engaging member may be formed such that the projection is formed of a metal material and fixed to the insulating member, and the end of the projection is plastically deformed and caulked to form the engaging member.

In addition, the notch of the base portion of the collector plate is desirably provided in at least one edge on the inside and the outside in the winding axis direction which is a direction where the electrode group is comparatively easy to move, and may be provided only in the thickness direction of the electrode group in parallel to the battery lid and intersecting with the winding axis direction. In addition, the current interrupting mechanism may be provided on a negative side.

REFERENCE SIGNS LIST 3A insulating member
3d projection
3f engaging member
3g support convex portion
3h engaging groove
5 diaphragm
10 battery container
11 battery lid (battery container)
12 battery can (battery container)
20A, 20B external terminal
30A, 30B collector plate
31 base portion
31a lower end surface (end surface)
31b side surface
32 terminal portion
33 notch
40 electrode group
41 positive electrode (electrode)
42 negative electrode (electrode)
43, 44 separator
50 current interrupting mechanism
100 secondary battery
d1, d2 depth
D winding axis
w1, w2 interval

The invention claimed is:

1. A secondary battery comprising:
   a current interrupting mechanism that interrupts a current path between an external terminal and an electrode in a battery container,
   wherein the current interrupting mechanism includes
      a collector plate that is connected to the electrode,
      a diaphragm that is connected to a base portion of the collector plate and disconnected from the base portion by being deformed when a pressure in the battery container is increased, and
      an insulating member that fixes the diaphragm and the base portion of the collector plate on the inside of the battery container,
   wherein the insulating member includes a projection that protrudes in a thickness direction of the base portion,
   wherein the base portion includes a notch through which the projection passes in the thickness direction, and
   wherein the projection includes an engaging member that is engaged with an end surface of the base portion on a side opposite to the insulating member and a side surface of the base portion along the thickness direction, and an electrode group that is formed by alternately stacking the electrode and a separator and by winding the electrode and the separator about a winding axis, wherein the collector plate is disposed in an end in a winding axis direction of the electrode group, wherein the base portion includes the notch on the inside in the winding axis direction, and wherein the insulating member includes a support convex portion that fixedly supports the end surface and the side surface of the base portion on the outside in the winding axis direction.

2. The secondary battery according to claim 1,
wherein the projection is formed of a thermoplastic resin material, and
wherein the engaging member is thermally welded to the end surface and the side surface of the base portion.

3. The secondary battery according to claim 2,
wherein the engaging member is thermally welded to a corner portion between the end surface and the side surface of the base portion.

4. The secondary battery according to claim 3,
wherein the engaging member is formed by enlarging the projection in a radial direction.

5. The secondary battery according to claim 4,
wherein the base portion further includes a notch on the outside in the winding axis direction.

6. The secondary battery according to claim 5,
wherein the collector plate includes a terminal portion that is extended from an end on the outside in the winding axis direction of the base portion and connected to the electrode in the end of the electrode group, and
wherein a depth of the notch on the outside of the base portion in the winding axis direction is larger than that of the notch on the inside.

7. The secondary battery according to claim 5,
wherein the collector plate includes a terminal portion that is extended from an end on the outside in the winding axis direction of the base portion and connected to the electrode in the end, and
wherein the base portion includes a pair of notches on the inside and the outside in the winding axis direction, and
wherein an interval between the pair of notches on the outside is smaller than that between the pair of notches on the inside.

8. The secondary battery according to claim 4,
wherein the support convex portion includes an engaging groove of which the inside in the winding axis direction is opened to engage the base portion.

9. The secondary battery according to claim 1,
wherein the diaphragm is made of aluminum or an aluminum alloy.

* * * * *